US012672662B2

(12) United States Patent
Heffernan, Jr. et al.

(10) Patent No.: US 12,672,662 B2
(45) Date of Patent: *Jul. 7, 2026

(54) COLLAGEN BEVERAGE COMPOSITION FOR NUTRITIONAL CONSUMPTION WITH NEUTRAL TO BASIC PH AND LOW DETECTABILITY

(71) Applicant: Pure Brands, Inc., Wilmington, DE (US)

(72) Inventors: John Vianney Heffernan, Jr., Powder Springs, GA (US); Brandon Gerberich, Rahway, NJ (US); Robert Alix, Atlanta, GA (US)

(73) Assignee: Pure Brands, Inc., Wilmington, DE (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/453,972

(22) Filed: Aug. 22, 2023

(65) Prior Publication Data

US 2024/0074464 A1      Mar. 7, 2024

Related U.S. Application Data

(60) Provisional application No. 63/488,905, filed on Mar. 7, 2023, provisional application No. 63/373,256, filed on Aug. 23, 2022.

(51) Int. Cl.
*A23L 2/66* (2006.01)
*A23K 20/147* (2016.01)
(Continued)

(52) U.S. Cl.
CPC .............. *A23L 2/66* (2013.01); *A23K 20/147* (2016.05); *A23K 20/22* (2016.05); *A23L 2/38* (2013.01);
(Continued)

(58) Field of Classification Search
CPC .............. A23L 2/66; A23L 2/00; A23L 33/17
See application file for complete search history.

(56) References Cited

U.S. PATENT DOCUMENTS 5,853,785 A * 12/1998 Nayyar .................... A23G 9/52
                                                              426/599
8,815,797 B2      8/2014 Minor
                                    (Continued)

FOREIGN PATENT DOCUMENTS

AU      2004287493 A1      5/2025
EP      2 923 583 A1      9/2015
                                    (Continued)

OTHER PUBLICATIONS

International Preliminary Report on Patentability and Written Opinion, Application No. PCT/US2023/072674, issued Feb. 25, 2025, 12 pages, The International Bureau of WIPO, Geneva, Switzerland.
(Continued)

*Primary Examiner* — Jenna A Watts
(74) *Attorney, Agent, or Firm* — Barnes & Thornburg. LLP; Tina M. Dorr

(57) ABSTRACT

According to embodiments, a beverage composition for human, animal, or other organism consumption includes water and a collagen protein in an amount of about 6 to about 40 grams per liter. The beverage composition has a pH of about 4.6 to about 11.0, and the beverage composition has a viscosity of about 1 to about 25 milliPascals at 5 degrees Celsius and shear rate of 100 s-1. The beverage composition is substantially free of a sweetener, a food acid, a flavoring agent, a de-foaming agent, or a combination thereof. The beverage composition is optically clear as measured by a turbidity of about 0.0001 to about 25 NTU as measured by ISO 7027-1:2016 test method.

19 Claims, 1 Drawing Sheet

(51) Int. Cl.

| | |
|---|---|
| *A23K 20/22* | (2016.01) |
| *A23L 2/38* | (2021.01) |
| *A23L 2/56* | (2006.01) |
| *A23L 2/60* | (2006.01) |
| *A23L 33/165* | (2016.01) |
| *A23L 33/19* | (2016.01) |

(52) U.S. Cl.
CPC .................. *A23L 2/56* (2013.01); *A23L 2/60* (2013.01); *A23L 33/165* (2016.08); *A23L 33/19* (2016.08)

(56) References Cited

U.S. PATENT DOCUMENTS

| | | |
|---|---|---|
| 9,420,816 B2 | 8/2016 | Minor |
| 2021/0267238 A1 | 9/2021 | Lauridsen et al. |
| 2024/0074463 A1 | 3/2024 | Heffernan, Jr. et al. |

FOREIGN PATENT DOCUMENTS

| | | |
|---|---|---|
| JP | 2019010087 A | 1/2019 |
| JP | 2019062771 A | 4/2019 |
| KR | 20130079408 A | 7/2013 |
| WO | 2012081971 A1 | 6/2012 |
| WO | 2013/049540 A2 | 4/2013 |
| WO | 2025166170 A1 | 8/2025 |

OTHER PUBLICATIONS

International Preliminary Report on Patentability and Written Opinion, Application No. PCT/US2023/072676, issued Feb. 25, 2025, 11 pages, The International Bureau of WIPO, Geneva, Switzerland.
International Search Report issued for International Patent Application No. PCT/2023/072676, dated Nov. 15, 2023.

Written Opinion issued for International Patent Application No. PCT/2023/072676, dated Nov. 15, 2023.
"Lacprodan ISO.Water," Arla Foods Ingredients Product Sheet P1453, Jun. 21, 2021, 3 pages.
Grande Ultra Whey Protein Isolate Product Data Sheet, Jul. 17, 2018, 1 page.
Azoulay, Arik "Comparison of the Mineral Content of Tap Water and Bottled Waters" J Gen Intern Med, Mar. 2001, vol. 16, pp. 168-175.
PB Leiner, Technical Datasheet, SF SOLUGEL Dynamica BD NA, Feb. 1, 2023, Edition 1, 3 pages, www.pbleiner.com.
Office Action in U.S. Appl. No. 18/453,969, issued Mar. 3, 2026, 33 pages, United States Patent and Trademark Office, Alexandria, Virginia.
International Search Report and Written Opinion in International Application No. PCT/US2023/072674 issued Nov. 27, 2023, 15 pages, European Patent Office, Rijswijk, New Zealand.
Webpage, 'Citrate Buffer (ph3.0 to 6.2) Preparation Recipe', AAT Bioquest, Inc., found Jan. 19, 2026 on webpage: https://www.aatbio.com/resources/buffer-preparations-and-recipes/citrate-buffer-ph-3-to-6-2?utm_source=chatgpt.com, 2 pages.
Webpage, Milpore Sigma, Buffer Reference Center, found Jan. 19, 2026 on webpage: https://www.sigmaakdrich.com/US/en/technical-documents/protocol/protein-biology/protein-concentration-and-buffer-exchange/buffer-reference-center, 15 pages.
Zheng, Yangyi, 'Changes in the physiochemical, flavor and stability of whey protein solutions during UHT processing and storage; a review', Food Science of Animal Products, 2023, 7 pages, Tsinghua University Press, Beijing, China.
Burrington, KJ, 'Essential Principles of Cheesemaking (Part 2): Measuring and Controlling Acidity and Moisture', Center for Dairy Research, Dairy Pipeline, 2020, vol. 31, No. 4, 12 pages, University of Wisconsin-Madison, Madison, Wisconsin.

* cited by examiner

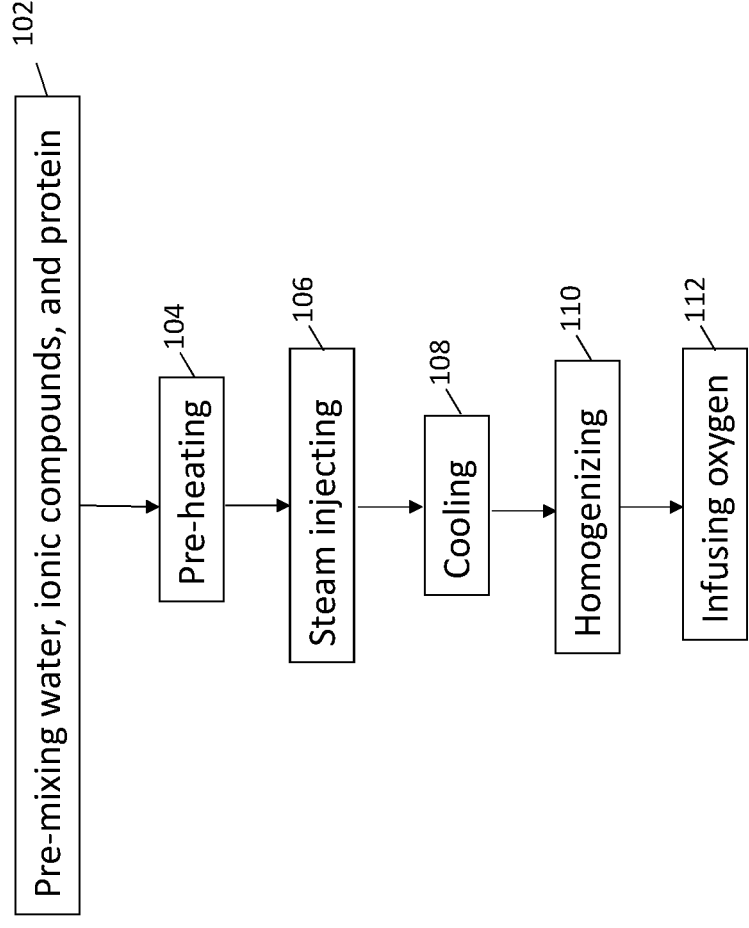
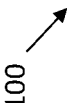

COLLAGEN BEVERAGE COMPOSITION FOR NUTRITIONAL CONSUMPTION WITH NEUTRAL TO BASIC PH AND LOW DETECTABILITY

CROSS-REFERENCE TO RELATED APPLICATIONS

This U.S. Nonprovisional patent application claims the benefit of U.S. Provisional Patent Application Nos. 63/373, 256, filed Aug. 23, 2022, and 63/488,905, filed Mar. 7, 2023, both of which are incorporated by reference herein in their entirety.

BACKGROUND

The present disclosure relates to protein beverage compositions, and more specifically, to protein beverage compositions for nutritional consumption with neutral to basic pH and low detectability.

Nutritional supplements, such as protein beverages and foods are consumed for muscle synthesis and maintenance, as well as body weight control and maintenance. Such nutritional supplements are used by a wide range of consumers, including athletes, children, the elderly, and patients with or at risk of malnutrition and/or with increased protein needs. Provided the broad consumer base and use, the consumer's perception and satisfaction of the nutritional supplement is important. A consumer's satisfaction with the nutritional supplement can depend on various factors, including taste, turbidity, mouth feel, amount of total protein, and types and qualities of ingredients.

SUMMARY

According to embodiments, a beverage composition for human, animal, or other organism consumption includes water and collagen protein in an amount of about 6 to about 40 grams per liter. The beverage composition has a pH of about 4.6 to about 11.0, and the beverage composition has a viscosity of about 1 to about 25 milliPascals at 5 degrees Celsius and shear rate of 100 s$^{-1}$. The beverage composition is substantially free of a sweetener, a food acid, a flavoring agent, a de-foaming agent, or a combination thereof. The beverage composition is optically clear as measured by a turbidity of about 0.0001 to about 25 NTU as measured by ISO 7027-1:2016 test method.

According to other embodiments, a beverage composition for human, animal, or other organism consumption includes water and collagen protein in an amount of about 6 to about 40 grams per liter. The beverage composition has a pH of about 4.6 to about 10.0. The beverage composition has a viscosity of about 1 to about 25 milliPascals at 5 degrees Celsius and shear rate of 100 s$^{-1}$. The beverage composition is optically clear as measured by a turbidity of about 0.0001 to about 25 NTU as measured by ISO 7027-1:2016 test method.

According to other embodiments, a method of making a beverage composition includes providing water with an ion profile. The method also includes adding collagen protein to the water in an amount of about 6 to about 40 grams per liter. The beverage composition has a pH of about 4.6 to about 10.0, and the beverage composition has a viscosity of about 1 to about 25 milliPascals at 5 degrees Celsius and shear rate of 100 s$^{-1}$.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 1 is a flow diagram illustrating a method of making protein beverages.

DETAILED DESCRIPTION

As mentioned above, a consumer's satisfaction with a protein nutritional supplement depends on various factors, including, but not limited to, taste, appearance turbidity, mouth feel, type and content of additives, and total protein. Consumers commonly complain that protein beverages suffer from a chalky taste/aftertaste, also referred to as a dry mouth-feel or astringency, which can stem from the protein or additional ingredients, such as flavor, sweeteners, emulsifying agents, thickening agents, food dyes, and other stabilizing agents, among others. To mask and mitigate unfavorable aftertastes, manufacturers include additional flavors and sweeteners in the beverage and food compositions. However, such flavors and sweeteners are frequently artificial and therefore undesired for health reasons. These flavors and sweeteners ineffectively mask the protein aftertaste by simply combining with the dry mouth-feel and imparting an artificial flavor. The additional flavors and sweeteners also add undesired calories to the nutritional supplement, as well as other undesired side effects, such as indigestion, decreased uptake of the protein itself, and even proclivity to certain ailments due to some of these ingredients being linked to diseases such as cancer. Some additives are even banned across Europe and Asia, e.g., Yellow 6.

While keeping in mind the consumer's experience, manufacturers of nutritional supplements are also concerned with using formulations and processes that are stable under a variety of conditions, including ambient room temperatures as well as chilled temperatures, for long periods of time. Another reason that manufacturers commonly add additives and/or sweeteners to protein nutritional supplements is to increase stability of the composition by inhibiting or mitigating bacterial growth, such as that of *Clostridium botulinum*. However, in addition to adding undesired calories and artificial additives, the sweeteners and other added ingredients increase the manufacturing cost and complexity.

Another strategy to increase protein stability, prevent precipitation in liquid beverages, and reduce undesired flavors is protein encapsulation (such as micro-encapsulation and nano-encapsulation). However, like flavor masking strategies, protein encapsulation simply adds undesired additives, as well as increases the processing costs and manufacturing process complexities.

Accordingly, described herein are protein nutritional supplements, including protein beverage compositions and waters, for consumption by humans and animals, with a neutral or basic pH and with low to no detectability in a transparent liquid beverage. Protein beverage compositions are optically clear, have a low turbidity, do not include additional ingredients or additives in many embodiments, and have a pH of about 4.6 to about 11, about 7 to about 10, about 7.5 to about 9, or about 8 to about 8.5 in some embodiments. The protein beverage compositions include a high protein content, e.g., at least at least 6 grams/Liter, at least 8 grams/Liter, at least 12 grams/Liter, at least 16 grams/Liter, at least 20 grams/Liter, or at least 24 grams/Liter, at least 28 grams/L, at least 32 grams/L, or at least 36 grams/L in some embodiments, without a detectable chalky protein taste/aftertaste, or dry mouth feel or astringency.

It was unexpectedly found that combining the protein in liquid water with a certain ion content results in an optically clear, transparent liquid beverage (e.g., water) with low turbidity and viscosity, and undetectable protein. Also surprisingly, even without additional additives or preservatives to lower the pH, the protein beverage composition remains stable and clear and optically transparent at ambient room and at chilled temperatures of about 2 to about 8 degrees Celsius for at least three months, six months, 12 months, or more than 12 months without any observable protein precipitation or bacterial growth. The protein beverage compositions described herein have a neutral or near neutral pH to basic pH, achieved by combining substantially pure protein with a nearly pure liquid water, only including certain critical ions at low but critical concentrations.

Liquid

The protein beverage compositions include a liquid. Non-limiting examples of the liquid include water, juice, coffee, alcoholic mixtures (e.g., beer and spirits), tea, milk (dairy and non-dairy milks, including nut-based milks, e.g., almond milk or cashew milk, and/or plant-based milks, e.g., oat milk), or a combination thereof. In embodiments, the liquid is water with the ions and concentrations described below.

In some embodiments, the water in the protein beverage is a "soft water" with a certain ion profile. As used herein, "soft water" is a water is water in which magnesium ions and calcium ions have been substituted with sodium ions. In some embodiments, soft water includes about 10 to about 100 milligrams per Liter (mg/L) of sodium ions, about 0.001 to about 1.0 mg/L calcium ions, and/or about 0.001 to about 1.0 mg/L magnesium ions.

In other embodiments, the water is distilled water, tap water, reverse osmosis water (RO), deionized water, pure water, spring water, or another type of water, provided that the protein beverage composition has the ion content and properties described herein.

In some embodiments, the water used to make the protein beverage composition includes about 10 to about 100 milligrams per Liter (mg/L) of sodium ions, about 20 to about 60 mg/L sodium ions, about 25 to about 55 mg/L sodium ions, about 30 to about 50 mg/L sodium ions, or about 35 to about 45 mg/L sodium ions. In one or more embodiments, the soft water used to make the protein beverage includes about or in any range between about 0.001, 0.01, 0.1, 1.0, 10, 15 20, 25, 30, 35, 40, 45, 50, 55, 60, 65, 70, 75, 80, 85, 90, 95, and 100 mg/L sodium ions. In some embodiments, sodium ions are present in the water, e.g., soft water, used to make the protein beverage composition, and a sodium compound is not added to the liquid to make the protein beverage composition. In some embodiments, the water used to make the protein beverage includes sodium ions, and a sodium compound is further added to the liquid water to increase the total sodium ion concentration.

In some embodiments, the water used to make the protein beverage composition includes about 0.5 to about 5.0 milligrams per Liter (mg/L) of potassium ions, about 1 to about 3 mg/L potassium ions, or about 1.5 to about 2.5 mg/L potassium ions. In one or more embodiments, the water used to make the protein beverage includes about or in any range between about 0.1 0.5, 1.0, 1.5, 2.0, 2.5, 3.0, 3.5, 4.0, 4.5, and 5.0 mg/L potassium ions. In some embodiments, potassium ions are present in the water, e.g., soft water, used to make the protein beverage composition, and a potassium compound is not added to the liquid to make the protein beverage composition. In other embodiments, the water used to make the protein beverage includes potassium ions, and a potassium compound is further added to the liquid water to increase the total potassium ion concentration.

In one or more embodiments, the water used to make the protein beverage composition includes about 0.001 to about 1 mg/L calcium ions. In other embodiments, the water used to make the protein beverage composition includes about 0.05 to about 0.5 mg/L calcium ions. Still yet, in other embodiments, the water used to make the protein beverage composition includes about or any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L calcium ions. In some embodiments, calcium ions are present in the water, e.g., soft water, used to make the protein beverage composition, and a calcium compound is not added to the liquid to make the protein beverage composition. In other embodiments, the water used to make the protein beverage includes calcium ions, and a calcium compound is further added to the liquid water to increase the total calcium ion concentration.

In one or more embodiments, the water used to make the protein beverage composition includes about 0.001 to about 1 mg/L magnesium ions. In other embodiments, the water used to make the protein beverage composition includes about 0.05 to about 0.5 mg/L magnesium ions. Still yet, in other embodiments, the water used to make the protein beverage composition includes about or any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L magnesium ions. In some embodiments, magnesium ions are present in the water, e.g., soft water, used to make the protein beverage composition, and a magnesium compound is not added to the liquid to make the protein beverage composition. In other embodiments, the water used to make the protein beverage includes magnesium ions, and a magnesium compound is further added to the liquid water to increase the total magnesium ion concentration.

In one or more embodiments, the water used to make the protein beverage composition includes about 15 to about 50 mg/L chloride ions. In other embodiments, the water used to make the protein beverage composition includes about 15 to about 45 mg/L chloride ions, about 20 to about 40 mg/L chloride ions, or about 25 to about 35 mg/L chloride ions. Still yet, in embodiments, the water used to make the protein beverage composition includes about or any range between about 15, 20, 25, 30, 35, 40, 45, and 50 mg/L chloride ions.

In embodiments, the water used to make protein beverage composition includes about 0.001 to about 0.5 mg/L fluoride ions. In one or more embodiments, the water used to make the protein beverage composition includes about 0.01 to about 0.3 mg/L fluoride ions. In other embodiments, the water used to make the protein beverage composition includes about or any range between about 0.001, 0.01, 0.05, 0.10, 0.15, 0.20, 0.25, 0.30, 0.35, 0.40, 0.45, and 0.50 fluoride ions. In some embodiments, fluoride ions are present in the water, e.g., soft water, used to make the protein beverage composition, and a fluoride compound is not added to the liquid to make the protein beverage composition.

In embodiments, the water used to make protein beverage composition includes about 1 to about 50 mg/L sulfate ions.

In one or more embodiments, the water used to make the protein beverage composition includes about 3 to about 20 mg/L sulfate ions. In other embodiments, the water used to make the protein beverage composition includes about or any range between about 1, 5, 10, 15, 20, 25, 30, 35, 40, 45, and 50 mg/L sulfate ions. In some embodiments, sulfate ions are present in the water, e.g., soft water, used to make the protein beverage composition, and a sulfate compound is not added to the liquid to make the protein beverage composition.

In one or more embodiments, the water used to make the protein beverage is a soft water has the composition and properties shown in Table 1 below.

used to make the beverage includes about or in any range between about 0.001, 0.01, 0.1, 0.5, 1, 1.5, 2, 2.5, 3, 3.5, 4, 4.5, 5, 5.5, 6, 6.5, 7, 7.5, 8, 8.5, 9, 9.5 and 10 mg/L sodium ions. In some embodiments, the water used to make the protein beverage includes sodium ions, and a sodium compound is further added to the liquid water to increase the total sodium ion concentration. In other embodiments, sodium ions are present in the water, e.g., reverse osmosis water, used to make the protein beverage composition, and a sodium compound is not added to the liquid to make the protein beverage composition.

In some embodiments, the water used to make the protein beverage composition includes about 0.001 to about 1

TABLE 1

| | Soft water | | | |
|---|---|---|---|---|
| Test method | Analysis/ Investigation of | Result | Uncertainty | Units |
| SS-EN ISO 7027-1: 2016 | Turbidity | <0.1 | ±0.12 | FNU |
| In-house method | Odour | — | | |
| In-house method | Odour, type | — | | |
| SS-EN ISO 7887 2012C mod | Color | <5 | ±2 | mg/l Pt |
| SS-EN 27888-1 | Conductivity 25° C. | 21.3 | ±2.13 | mS/m |
| SS-EN ISO 10523: 2012 | pH at 20° C. | 8.3 | ±0.2 | |
| SS-EN ISO 9963-2, ed 1 | Alkalinity | 42 | ±6.3 | mg/l |
| fd SS028118-1 | Chemical oxygen demand | 1.6 | ±0.40 | mg/l |
| ISO 15923-1: 2013 B | Ammonium nitrogen, $NH_4$—N | <0.01 | ±0.005 | mg/l |
| Calculated | Ammonium, $NH_4$ | <0.02 | ±0.01 | mg/l |
| SS-EN ISO 10304-1: 2009 | Nitrate nitrogen, $NO_3$—N | 0.21 | ±0.045 | mg/l |
| Calculated | Nitrate, $NO_3$ | 0.93 | | mg/l |
| ISO 15923-1: 2013 D | Nitrite nitrogen, NO | <0.001 | ±0.0009 | mg/l |
| SS-EN ISO 13395, calc | Nitrite, $NO_2$ | <0.004 | ±0.003 | mg/l |
| Calculated | Sum $NO_3$/50 + $NO_2$/0.5 | <0.02 | | |
| SS-EN ISO 10304-1: 2009 | Fluoride, F | 0.10 | ±0.10 | mg/l |
| SS-EN ISO 10304-1: 2009 | Chloride, Cl | 32 | ±4.8 | mg/l |
| SS-EN ISO 10304-1: 2009 | Sulphate, $SO_4$ | 5.8 | ±0.90 | mg/l |
| SS-EN ISO 11885: 2009 | Aluminium, Al | <0.03 | ±0.02 | mg/l |
| SS-EN ISO 11885: 2009 | Iron, Fe | <0.05 | ±0.01 | mg/l |
| SS-EN ISO 11885: 2009 | Calcium, Ca | 0.27 | ±0.04 | mg/l |
| SS-EN ISO 11885: 2009 | Potassium, K | 2 | ±0.3 | mg/l |
| SS-EN ISO 11885: 2009 | Copper, Cu | <0.02 | ±0.01 | mg/l |
| SS-EN ISO 11885: 2009 | Magnesium, Mg | 0.13 | ±0.040 | mg/l |
| SS-EN ISO 11885: 2009 | Manganese, Mn | <0.02 | ±0.004 | mg/l |
| SS-EN ISO 11885: 2009 | Sodium, Na | 39 | ±5.9 | mg/l |
| Calculated | Hardness (German degrees) | <0.2 | ±0.16 | °dH |

In some embodiments, the water in the beverage is a "reverse osmosis water" or "RO water" with a certain ion profile. As used herein, "reverse osmosis water" is a water that has been filtered by passing water through a semi-permeable membrane material under pressure to flow the water from a concentrated side (with contaminants) to a less concentrated side (with fewer contaminants). In some embodiments, reverse osmosis water includes about 0.001 to about 10 milligrams per Liter (mg/L) of sodium ions, about 0.001 to about 1.0 mg/L calcium ions, and/or about 0.001 to about 1.0 mg/L magnesium ions.

In some embodiments, the water used to make the beverage composition includes about 0.001 to about 10 milligrams per Liter (mg/L) of sodium ions, about 0.01 to about 5 mg/L sodium ions, about 0.1 to about 3 mg/L sodium ions, about 0.5 to about 2.5 mg/L sodium ions, or about 1 to about 2 mg/L sodium ions. In one or more embodiments, the water milligrams per Liter (mg/L) of potassium ions, about 0.01 to about 0.5 mg/L potassium ions, or about 0.03 to about 0.3 mg/L potassium ions. In one or more embodiments, the water used to make the beverage includes about or in any range between about 0.001, 0.01, 0.05, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L potassium ions. In some embodiments, the water used to make the protein beverage includes potassium ions, and a potassium compound is further added to the liquid water to increase the total potassium ion concentration. In some embodiments, potassium ions are present in the water, e.g., reverse osmosis water, used to make the beverage composition, and a potassium compound is not added to the liquid to make the protein beverage composition.

In one or more embodiments, the water used to make the beverage composition includes about 0.001 to about 1 mg/L calcium ions, about 0.01 to about 0.5 mg/L calcium ions, or about 0.03 to about 0.3 mg/L calcium ions. In one or more embodiments, the water used to make the beverage includes about or in any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L calcium ions. In some embodiments, the water used to make the protein beverage includes calcium ions, and a calcium compound is further added to the liquid water to increase the total calcium ion concentration. In other embodiments, calcium ions are present in the water, e.g., reverse osmosis water, used to make the beverage composition, and a calcium compound is not added to the liquid to make the beverage composition.

In one or more embodiments, the water used to make the beverage composition includes about 0.001 to about 1 mg/L magnesium ions. In other embodiments, the water used to make the beverage composition includes about 0.05 to about 0.5 mg/L magnesium ions. Still yet, in other embodiments, the water used to make the protein composition includes about or any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L magnesium ions. In some embodiments, the water used to make the protein beverage includes magnesium ions, and a magnesium compound is further added to the liquid water to increase the total magnesium ion concentration. In some embodiments, magnesium ions are present in the water, e.g., reverse osmosis water, used to make the beverage composition, and a magnesium compound is not added to the liquid to make the beverage composition.

In embodiments, the water used to make beverage composition includes at least 0.001 milligrams per liter (mg/L) of chloride ions. In one or more embodiments, the water used to make the beverage composition includes about 0.001 to about 10 mg/L chloride ions. In other embodiments, the water used to make the beverage composition includes about 0.01 to about 5 mg/L chloride ions, about 0.1 to about 2 mg/L chloride ions, or about 0.1 to about 1 mg/L chloride ions. Still yet, in embodiments, the water used to make the beverage composition includes about or any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0, 1.5, 2, 2.5, 3, 3.5, 4, 4.5, 5, 5.5, 6, 6.5, 7, 7.5, 8, 8.5, 9, 9.5, and 10 mg/L chloride ions. In some embodiments, the water used to make the protein beverage includes chloride ions, and a chloride compound is further added to the liquid water to increase the total chloride ion concentration. In some embodiments, chloride ions are present in the water, e.g., reverse osmosis water, used to make the beverage composition, and a chloride compound is not added to the liquid to make the beverage composition.

In embodiments, the water used to make the beverage composition includes 0.001 to about 1 milligrams per Liter (mg/L) of fluoride ions, about 0.01 to about 0.5 mg/L fluoride ions, or about 0.03 to about 0.3 mg/L fluoride ions. In one or more embodiments, the water used to make the beverage includes about or in any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L fluoride ions. In some embodiments, fluoride ions are present in the water, e.g., reverse osmosis water, used to make the beverage composition, and a fluoride compound is not added to the liquid to make the protein beverage composition.

In embodiments, the water used to make the beverage composition includes 0.001 to about 5 milligrams per Liter (mg/L) of sulfate ions, about 0.01 to about 2.5 mg/L sulfate ions, or about 0.5 to about 2 mg/L sulfate ions. In one or more embodiments, the water used to make the beverage includes about or in any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0, 1.5, 2, 2.5, 3, 3.5, 4, 4.5, and 5 mg/L sulfate ions. In some embodiments, sulfate ions are present in the water, e.g., reverse osmosis water, used to make the beverage composition, and a sulfate compound is not added to the liquid to make the beverage composition.

In one or more embodiments, the water used to make the beverage composition is a reverse osmosis water and has the composition has properties shown in Table 2 below.

TABLE 2

| | Reverse osmosis water | | | |
| Test method | Analysis/ Investigation of | Result | Uncertainty | Units |
| --- | --- | --- | --- | --- |
| SS-EN ISO 7027-1: 2016 | Turbidity | <0.21 | ±0.12 | FNU |
| In-house method | Odour | — | | |
| In-house method | Odour, type | — | | |
| SS-EN ISO 7887 2012C mod | Color | <5 | ±2 | mg/l Pt |
| SS-EN 27888-1 | Conductivity 25° C. | <2 | ±0.600 | mS/m |
| SS-EN ISO 10523: 2012 | pH at 20° C. | 7.0 | ±0.2 | |
| SS-EN ISO 9963-2, ed 1 | Alkalinity | 2.8 | ±0.70 | mg/l |
| fd SS028118-1 | Chemical oxygen demand | <0.5 | ±0.25 | mg/l |
| ISO 15923-1: 2013 B | Ammonium nitrogen, $NH_4$—N | <0.01 | ±0.005 | mg/l |
| Calculated | Ammonium, $NH_4$ | <0.02 | ±0.01 | mg/l |
| SS-EN ISO 10304-1: 2009 | Nitrate nitrogen, $NO_3$—N | <0.05 | ±0.0045 | mg/l |
| Calculated | Nitrate, $NO_3$ | <0.3 | | mg/l |
| ISO 15923-1: 2013 D | Nitrite nitrogen, NO | <0.001 | ±0.0009 | mg/l |
| SS-EN ISO 13395, calc | Nitrite, $NO_2$ | <0.004 | ±0.003 | mg/l |
| SS-EN ISO 10304-1: 2009 | Fluoride, F | ±0.05 | ±0.10 | mg/l |
| SS-EN ISO 10304-1: 2009 | Chloride, Cl | 1.1 | ±0.90 | mg/l |
| SS-EN ISO 10304-1: 2009 | Sulphate, $SO_4$ | <1 | ±0.90 | mg/l |

TABLE 2-continued

| | Reverse osmosis water | | | |
|---|---|---|---|---|
| Test method | Analysis/ Investigation of | Result | Uncertainty | Units |
| SS-EN ISO 11885: 2009 | Aluminium, Al | <0.03 | ±0.02 | mg/l |
| SS-EN ISO 11885: 2009 | Iron, Fe | <0.05 | ±0.01 | mg/l |
| SS-EN ISO 11885: 2009 | Calcium, Ca | <0.05 | ±0.01 | mg/l |
| SS-EN ISO 11885: 2009 | Potassium, K | <0.5 | ±0.1 | mg/l |
| SS-EN ISO 11885: 2009 | Copper, Cu | <0.02 | ±0.01 | mg/l |
| SS-EN ISO 11885: 2009 | Magnesium, Mg | <0.1 | ±0.040 | mg/l |
| SS-EN ISO 11885: 2009 | Manganese, Mn | <0.02 | ±0.004 | mg/l |
| SS-EN ISO 11885: 2009 | Sodium, Na | 1.7 | ±0.26 | mg/l |
| Calculated | Hardness (German degrees) | <0.2 | ±0.16 | °dH |

The water used to make the beverage composition is not limited to reverse osmosis water or soft water. In some embodiments, the water used to make the beverage composition includes about 0.001 to about 60 milligrams per Liter (mg/L) of sodium ions, about 25 to about 55 mg/L sodium ions, about 30 to about 50 mg/L sodium ions, or about 35 to about 45 mg/L sodium ions. In one or more embodiments, the water used to make the protein beverage includes about or in any range between about 0.001, 0.01, 0.1, 1.0, 10, 15 20, 25, 30, 35, 40, 45, 50, 55, 60, 65, 70, 75, 80, 85, 90, 95, and 100 mg/L sodium ions. In some embodiments, sodium ions are present in the water used to make the protein beverage composition, and a sodium compound is not added to the liquid to make the protein beverage composition. In some embodiments, the water used to make the protein beverage includes sodium ions, and a sodium compound is further added to the liquid water to increase the total sodium ion concentration.

In some embodiments, the water used to make the protein beverage composition includes about 0.5 to about 5.0 milligrams per Liter (mg/L) of potassium ions, about 1 to about 3 mg/L potassium ions, or about 1.5 to about 2.5 mg/L potassium ions. In one or more embodiments, the water used to make the protein beverage includes about or in any range between about 0.1 0.5, 1.0, 1.5, 2.0, 2.5, 3.0, 3.5, 4.0, 4.5, and 5.0 mg/L potassium ions. In some embodiments, potassium ions are present in the used to make the protein beverage composition, and a potassium compound is not added to the liquid to make the protein beverage composition. In other embodiments, the water used to make the protein beverage includes potassium ions, and a potassium compound is further added to the liquid water to increase the total potassium ion concentration.

In one or more embodiments, the water used to make the protein beverage composition includes about 0.001 to about 1 mg/L calcium ions. In other embodiments, the water used to make the protein beverage composition includes about 0.05 to about 0.5 mg/L calcium ions. Still yet, in other embodiments, the water used to make the protein beverage composition includes about or any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L calcium ions. In some embodiments, calcium ions are present in the water used to make the protein beverage composition, and a calcium compound is not added to the liquid to make the protein beverage composition. In other embodiments, the water used to make the protein beverage includes calcium ions, and a calcium compound is further added to the liquid water to increase the total calcium ion concentration.

In one or more embodiments, the water used to make the protein beverage composition includes about 0.001 to about 1 mg/L magnesium ions. In other embodiments, the water used to make the protein beverage composition includes about 0.05 to about 0.5 mg/L magnesium ions. Still yet, in other embodiments, the water used to make the protein beverage composition includes about or any range between about 0.001, 0.01, 0.0.5, 0.1, 0.15, 0.20, 0.25, 0.30, 0.35, 0.40, 0.45, 0.50, 0.55, 0.60, 0.65, 0.70, 0.75, 0.80, 0.85, 0.90, 1.0 mg/L magnesium ions. In some embodiments, magnesium ions are present in the water used to make the protein beverage composition, and a magnesium compound is not added to the liquid to make the protein beverage composition. In other embodiments, the water used to make the protein beverage includes magnesium ions, and a magnesium compound is further added to the liquid water to increase the total magnesium ion concentration.

In one or more embodiments, the water used to make the protein beverage composition includes about 15 to about 50 mg/L chloride ions. In other embodiments, the water used to make the protein beverage composition includes about 15 to about 45 mg/L chloride ions, about 20 to about 40 mg/L chloride ions, or about 25 to about 35 mg/L chloride ions. Still yet, in embodiments, the water used to make the protein beverage composition includes about or any range between about 15, 20, 25, 30, 35, 40, 45, and 50 mg/L chloride ions.

In embodiments, the water used to make protein beverage composition includes about 0.001 to about 0.5 mg/L fluoride ions. In one or more embodiments, the water used to make the protein beverage composition includes about 0.01 to about 0.3 mg/L fluoride ions. In other embodiments, the water used to make the protein beverage composition includes about or any range between about 0.001, 0.01, 0.05, 0.10, 0.15, 0.20, 0.25, 0.30, 0.35, 0.40, 0.45, and 0.50 fluoride ions. In some embodiments, fluoride ions are present in the water used to make the protein beverage composition, and a fluoride compound is not added to the liquid to make the protein beverage composition.

In embodiments, the water used to make protein beverage composition includes about 1 to about 50 mg/L sulfate ions. In one or more embodiments, the water used to make the protein beverage composition includes about 3 to about 20 mg/L sulfate ions. In other embodiments, the water used to make the protein beverage composition includes about or any range between about 1, 5, 10, 15, 20, 25, 30, 35, 40, 45, and 50 mg/L sulfate ions. In some embodiments, sulfate ions are present in the water used to make the protein beverage composition, and a sulfate compound is not added to the liquid to make the protein beverage composition.

While types of waters referred to as soft water and reverse osmosis water are described above, the beverage compositions are not intended to be limited to these compositions. Any water that meets the described limitations herein with respect to ion type, concentrations, and other resulting properties can be used.

In some embodiments, the water used to make the beverage composition includes about 0.001 to about 750 milligrams per Liter (mg/L) of sodium ions, about 0.01 to about 500 mg/L sodium ions, about 0.1 to about 250 mg/L sodium ions, about 0.5 to about 100 mg/L sodium ions, or about 1 to about 50 mg/L sodium ions. In one or more embodiments, the water used to make the beverage includes about or in any range between about 0.001, 0.01, 0.1, 0.5, 1, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 mg/L sodium ions. In some embodiments, the water used to make the protein beverage includes sodium ions, and a sodium compound is further added to the liquid water to increase the total sodium ion concentration. In other embodiments, sodium ions are present in the water used to make the protein beverage composition, and a sodium compound is not added to the liquid to make the protein beverage composition.

In some embodiments, the water used to make the protein beverage composition includes about 0.001 to about 750 milligrams per Liter (mg/L) of potassium ions, about 0.01 to about 500 mg/L potassium ions, or about 0.1 to about 250 mg/L potassium ions, about 0.5 to about 100 mg/L potassium ions, or about 1 to about 50 mg/L potassium ions. In one or more embodiments, the water used to make the beverage includes about or in any range between about 0.001, 0.01, 0.1, 0.5, 1, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 mg/L sodium ions. In some embodiments, the water used to make the protein beverage includes sodium ions, and a sodium compound is further added to the liquid water to increase the total sodium ion concentration. In other embodiments, sodium ions are present in the water used to make the protein beverage composition, and a sodium compound is not added to the liquid to make the protein beverage composition.

In some embodiments, the water used to make the protein beverage composition includes about 0.001 to about 750 milligrams per Liter (mg/L) of calcium ions, about 0.01 to about 500 mg/L calcium ions, or about 0.1 to about 250 mg/L calcium ions, about 0.5 to about 100 mg/L calcium ions, or about 1 to about 50 mg/L calcium ions. In one or more embodiments, the water used to make the beverage includes about or in any range between about 0.001, 0.01, 0.1, 0.5, 1, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 mg/L calcium ions. In some embodiments, the water used to make the protein beverage includes calcium ions, and a calcium compound is further added to the liquid water to increase the total calcium ion concentration. In other embodiments, calcium ions are present in the water used to make the protein beverage composition, and a calcium compound is not added to the liquid to make the protein beverage composition.

In some embodiments, the water used to make the protein beverage composition includes about 0.001 to about 750 milligrams per Liter (mg/L) of magnesium ions, about 0.01 to about 500 mg/L magnesium ions, or about 0.1 to about 250 mg/L magnesium ions, about 0.5 to about 100 mg/L magnesium ions, or about 1 to about 50 mg/L magnesium ions. In one or more embodiments, the water used to make the beverage includes about or in any range between about 0.001, 0.01, 0.1, 0.5, 1, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 mg/L magnesium ions. In some embodiments, the water used to make the protein beverage includes magnesium ions, and a magnesium compound is further added to the liquid water to increase the total magnesium ion concentration. In other embodiments, magnesium ions are present in the water used to make the protein beverage composition, and a magnesium compound is not added to the liquid to make the protein beverage composition.

Ionic Compounds Added to the Water

In embodiments, the beverage composition is formed by adding one or more of the following ionic compounds (also referred to as salts) and/or ions to a liquid, e.g., water, soft water, or reverse osmosis water: potassium bicarbonate, sodium bicarbonate, magnesium sulfate, calcium chloride, trisodium citrate, sodium chloride, sodium hydroxide, sodium hexaphosphate, or a combination thereof.

Non-limiting examples of ions in the protein beverage composition, which may or may not be present in measurable amounts in the starting water, include sodium ions, magnesium ions, potassium ions, calcium ions, zinc ions, iron ions, manganese ions, cobalt ions, copper ions, chromium ions, molybdenum ions, hydroxide ions, chloride ions, iodide ions, fluoride ions, sulfate ions, selenate ions, silicate ions, phosphate ions, carbonate ions, bicarbonate ions, citrate ions, sulfate ions, or any combination thereof.

In one or more embodiments, one or more types of a sodium compound is added to the starting liquid water and protein to form the beverage composition. The order of combination is not limited. The ionic compounds are added to the water, followed by the protein in some embodiments. In other embodiments, protein is added to the water, followed by the ionic compounds in other embodiments.

Sodium compounds are salts that include sodium. Non-limiting examples of sodium compounds include sodium chloride, sodium bicarbonate, trisodium citrate (also referred to as sodium citrate), or a combination thereof.

The ionic compounds are added to liquid water described above. The starting liquid water may include measurable concentrations of the added ions.

In some embodiments, the sodium compound is added to the water to provide a final sodium concentration of about 20 to about 1000 milligrams per Liter (mg/L) in the beverage composition. In other embodiments, the sodium compound is added to the water to provide a final sodium concentration of about 30 to about 800 mg/L in the beverage composition. Still, in other embodiments, the sodium compound is added to the water to provide a final sodium concentration about or in any range between about 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, and 1000 mg/L in the beverage composition. In one or more embodiments, a sodium compound is not added to the water to increase the final sodium concentration, and the only sodium present in the beverage is present in the starting water.

In some embodiments, the citrate compound is added to the water to provide a final citrate concentration of about 5 to about 400 milligrams per Liter (mg/L) in the beverage composition. In other embodiments, the citrate compound is added to the water to provide a final citrate concentration of about 80 to about 300 mg/L in the beverage composition. Still, in other embodiments, the citrate compound is added to the water to provide a final citrate concentration about or in any range between about 5, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, and 400 mg/L in the beverage composition.

In some embodiments, the bicarbonate compound is added to the water to provide a final bicarbonate concentration of about 5 to about 400 milligrams per Liter (mg/L) in the beverage composition. In other embodiments, the bicarbonate compound is added to the water to provide a final bicarbonate concentration of about 80 to about 300 mg/L in the beverage composition. Still, in other embodiments, the bicarbonate compound is added to the water to provide a final bicarbonate concentration about or in any range between about 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, and 400 mg/L in the beverage composition.

In some embodiments, the potassium compound is added to the water to provide a final potassium concentration of about 10 to about 1000 milligrams per Liter (mg/L) in the beverage composition. In other embodiments, the potassium compound is added to the water to provide a final potassium concentration of about 20 to about 750 mg/L in the beverage composition. Still, in other embodiments, the potassium compound is added to the water to provide a final potassium concentration about or in any range between about 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, and 1000 mg/L in the beverage composition. In one or more embodiments, a potassium compound is not added to the water to increase the final sodium concentration, and the only potassium present in the beverage is present in the starting water.

In some embodiments, the calcium compound is added to the water to provide a final calcium concentration of about 10 to about 1000 milligrams per Liter (mg/L) in the beverage composition. In other embodiments, the calcium compound is added to the water to provide a final calcium concentration of about 20 to about 750 mg/L in the beverage composition. Still, in other embodiments, the calcium compound is added to the water to provide a final calcium concentration about or in any range between about 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, and 1000 mg/L in the beverage composition. In one or more embodiments, a calcium compound is not added to the water to increase the final calcium concentration, and the only calcium present in the beverage is present in the starting water.

In some embodiments, the chloride compound is added to the water to provide a final chloride concentration of about 10 to about 1000 milligrams per Liter (mg/L) in the beverage composition. In other embodiments, the chloride compound is added to the water to provide a final chloride concentration of about 20 to about 750 mg/L in the beverage composition. Still, in other embodiments, the chloride compound is added to the water to provide a final chloride concentration about or in any range between about 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, 400, 410, 420, 430, 440, 450, 460, 470, 480, 490, 500, 550, 600, 650, 700, 750, 800, 850, 900, 950, and 1000 mg/L in the beverage composition. In one or more embodiments, a chloride compound is not added to the water to increase the final chloride concentration, and the only chloride present in the beverage is present in the starting water.

In embodiments, one or more of the foregoing ionic compounds is added to the protein water mixture, or the water alone before protein is added. In some embodiments, a chelating agent or chelating salt is added to the protein water mixture, or the water alone before protein is added. A non-limiting example of a chelating agent or chelating salt includes trisodium citrate (also referred to as sodium citrate). Citrate chelates divalent metal ions, such as magnesium and calcium, and trivalent metal ions. It was unexpectedly found that, in some embodiments, adding a chelating salt, such as a citrate containing salt that sequesters such cations, improves solubility and clarity by removing components naturally bound to the protein.

In some embodiments, trisodium citrate is added to the liquid (e.g., water, soft water, or reverse osmosis water) in an amount of about 5 to about 400 mg/L to provide the protein beverage compositions with a total citrate of about 10 to about 400 mg/L citrate. In other embodiments, the trisodium citrate compound is add to the water or water/protein mixture to provide protein beverage compositions with about 10 to about 300 mg/L citrate. Still yet, in other embodiments, the trisodium citrate compound is added to the water or water/protein mixture to provide a protein beverage composition with about or in any range between about 5, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, and 400 mg/L total citrate.

In some embodiments, sodium bicarbonate or potassium bicarbonate is added to the liquid (e.g., water, soft water, or reverse osmosis water) in an amount of about 5 to about 400 mg/L to provide the protein beverage compositions with a total bicarbonate of about 10 to about 400 mg/L bicarbonate. In other embodiments, the sodium bicarbonate or potassium bicarbonate compound is add to the water or water/protein mixture to provide protein beverage compositions with about 10 to about 300 mg/L bicarbonate. Still yet, in other embodiments, the sodium bicarbonate or potassium bicarbonate compound is added to the water or water/protein mixture to provide a protein beverage composition with about or in any range between about 5, 10, 20, 30, 40, 50, 60, 70, 80, 90, 100, 110, 120, 130, 140, 150, 160, 170, 180, 190, 200, 210, 220, 220, 230, 240, 250, 260, 270, 280, 290, 300, 310, 320, 330, 340, 350, 360, 370, 380, 390, and 400 mg/L total bicarbonate.

In one or more embodiments, a basic compound is added to the water or water protein mixture to increase the sodium and hydroxide ion concentrations of the protein beverage composition. The basic compound is a basic ionic compound that raises the pH to the desired pH of the protein beverage composition. Non-limiting examples of basic compounds include sodium hydroxide. In some embodiments, about 0.01 to about 0.5 mg/L of sodium hydroxide is added to the protein composition. In other embodiments, about 0.05 to about 0.15 mg/L of sodium hydroxide is added to the protein composition. In embodiments, sodium hydroxide is added to the protein beverage composition in an amount about or in any range between about 0.01, 0.05, 0.10, 0.15, 0.20, 0.25, 0.30, 0.35, 0.40, 0.45, and 0.50 mg/L.

In was further unexpectedly discovered that in some embodiments, sodium hydroxide or a basic compound was not required to increase the pH of the beverage and that protein alone increased the pH, which was also stable over time. It was unexpectedly found that using certain ion profiles in the protein beverage composition liquid resulted in a clear, optically transparent liquid beverage with low turbidity and viscosity, and a clean, sulfur-free taste. The starting liquid water ion profile, including the particular ions and their concentrations, is particularly important to provide the clear, optically transparent beverage as ion contents outside of the described thresholds results in a more turbid and viscous liquid beverage with lower optical transparency.

In one or more embodiments, the protein beverage compositions are made such that they do not include any additional additives other than the ions present in the liquid (e.g., soft or reverse osmosis water) or is substantially free of additional additives, ions, and/or salts other than the ions present in the liquid and those added as described herein. "Substantially-free" of additional additives, ions, and/or salts means less than 0.1% by weight, less than 0.01% by weight, less than 0.001% by weight, less than 0.0001% by weight, less than 1 milligram per liter, less than 0.1 milligram per milliliter, less than 0.001 milligram per milliliter, or less than 0.0001 milligram per milliliter. Non-limiting examples of additional additives that are excluded include, but are not limited to, carbohydrates, fats, oils, emulsifying agents, thickening agents, de-foaming agents (e.g., silicon dioxide), food dyes (e.g., Red 40, Yellow 6), juices, inulin, gels, phosphates, metals, vitamins, minerals, carrageenan, caffeine, concentrates, fibers, caseins, or any combination thereof.

In some embodiments, the final beverage composition is substantially free of one or more of the following ions: sodium, potassium, calcium, magnesium, chloride, sulfate, or any combination thereof.

pH Value Range

The pH of the protein beverage composition is near neutral or neutral to basic and at least 4.6. In one or more embodiments, the pH of the protein beverage composition is about 7 to about 11. In embodiments, the pH of the protein beverage composition is about 6.5 to about 10. In some embodiments, the pH of the protein beverage composition is about or in any range between about 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, and 11.0.

The neutral or near neutral pH to basic pH is achieved without adding additional additives, sweeteners, food acids, or flavoring agents. In some embodiments, the protein beverage compositions do not include a sweetener, or are substantially free of a sweetener, i.e., include less than 1% by weight of a sweeter in some embodiments. In other embodiments, the protein beverage compositions do not include a food acid, or are substantially free of a food acid, i.e., include less than 1% by weight of a food acid in some embodiments. Yet, in other embodiments, the protein beverage compositions do not include a flavoring agent, or are substantially free of a flavoring, i.e., include less than 1% by weight of a flavoring agent in embodiments.

In one or more embodiments, the protein beverage composition is substantially free of one or more of a lactose compound, i.e., includes less than 1% by weight of one or more of a lactose compound.

Non-limiting examples of sweeteners include carbohydrate sweeteners, polyols and/or high intensity sweeteners. High intensity sweeteners include, but are not limited to, aspartame, cyclamate, sucralose, acesulfame salt, neotame, saccharin, stevia extract, a steviol glycoside such as rebaudioside A, allulose, erythritol, other sugar alcohols, or a combination thereof. Polyol sweeteners include, but are not limited to, maltitol, mannitol, lactitol, sorbitol, inositol, xylitol, threitol, galactitol, or combinations thereof. Non-limiting examples food acids include organic acids, such as citric acid, citrate salt, lactic acid, lactate salt, or a combination thereof. Flavoring agents include natural and non-natural food flavoring agents.

In one or more embodiments, the protein beverage composition includes a buffering ion (or a pH modulating ion) with at least one pKa value of at least 8. At least one of the pKa values of the buffering ion is at least 9 in some embodiments. In other embodiments, at least one of the pKa values of the buffering ion is at least 10. In one or more embodiments, at least one of the buffering ion is bicarbonate, with a pKa of about 10.3. In other embodiments, the protein beverage composition does not include a buffering ion.

In embodiments, the buffering ion is present in the protein beverage composition in an amount of at least 0.05 mg/L. In other embodiments, the buffering ion is present in the protein beverage composition in an amount of about 0.5 to about 5 mg/L.

Protein

The protein beverage composition includes a protein that is one or more of a whey protein isolate, a whey protein concentrate, a casein protein, an egg white protein, a collagen protein, a plant protein (e.g., a nut protein), a microorganism-generated protein, a synthetic protein, an animal protein (e.g., a bovine protein), or a combination thereof. Non-limiting examples of plant protein isolate include a pea protein, a soy protein, a legume-sourced protein, a hemp protein, a pumpkin seed protein, or a combination thereof.

In one or more embodiments, the protein is a whey protein isolate and includes a combination of alanine, arginine, aspartic acid (asparagine), cysteine (cystine), glutamic acid (glutamine), glycine, histidine, isoleucine, leucine, lysine, methionine, phenylalanine, proline, serine, threonine, tryptophan, tyrosine, and valine. In some embodiments, the amino acid profile of the protein is shown in Table 2 below.

TABLE 3

| Amino acid profile of protein | |
|---|---|
| Amino acid | Grams per 100 grams protein |
| Alanine | 4.9-6.1 |
| Arginine | 1.9-2.4 |
| Aspartic acid | 10.7-12.2 |
| Cysteine | 1.7-2.4 |
| Glutamic acid | 16.9-20.0 |
| Glycine | 1.4-1.9 |
| Histidine | 1.5-1.9 |
| Isoleucine | 6.0-7.4 |
| Leucine | 11.1-12.1 |
| Lysine | 9.7-10.9 |
| Methionine | 1.9-2.6 |
| Phenylalanine | 2.9-3.4 |
| Proline | 4.9-7.1 |
| Serine | 4.0-5.3 |
| Threonine | 6.0-8.1 |
| Tryptophan | 1.7-2.4 |
| Tyrosine | 2.8-3.2 |
| Valine | 5.3-6.6 |

In some embodiments, the protein is a collagen protein. In one or more embodiments, the collagen is a bovine collagen, a fish collagen, a plant-based collagen (e.g., a seaweed collagen), a hydrolyzed bovine collagen protein, hydrolyzed collagen, gelatin hydrolysate, or gelatin derivative. In embodiments, the collagen protein is substantially free of additives and/or preservatives. In other embodiments, the protein includes a combination of alanine, arginine, aspartic acid (asparagine), cysteine (cystine), glutamic acid (glutamine), glycine, histidine, isoleucine, leucine, lysine, methionine, phenylalanine, proline, serine, threonine, tryptophan, tyrosine, and valine, or any combination thereof. In one or more embodiments, the protein is a collagen protein with the following amino acid profile shown in Table 4.

TABLE 4

| Amino acid profile of collagen protein | |
|---|---|
| Amino acid | % on Dry Solid Protein |
| Alanine | 7.0-11.0 |
| Arginine | 5.3-9.3 |
| Aspartic acid | 3.1-7.1 |
| Cystine/Cysteine | 0.0-2.0 |
| Glutamic acid | 7.7-11.7 |
| Glycine | 21.6-25.6 |
| Histidine | 1.0-3.0 |
| Hydroxyproline | 11.0-15.0 |
| Isoleucine | 0.0-3.5 |
| Leucine | 0.8-4.8 |
| Lysine | 1.3-5.3 |
| Methionine | 0.0-2.7 |
| Phenylalanine | 0.0-4.0 |
| Proline | 11.4-15.4 |
| Serine | 1.2-5.2 |
| Threonine | 0.0-2.0 |
| Tryptophan | 0.0-2.4 |
| Tyrosine | 0.0-2.4 |
| Valine | 0.3-4.3 |

In some embodiments, the protein beverage composition includes one or more additives, including but not limited to, vitamins, flavoring agent, coloring agent, minerals, sweeteners, antioxidants, food acid, lipids, carbohydrates, prebiotics, probiotics, anti-foaming agents, or a combination thereof.

In one or more embodiments, the protein beverage composition has a total protein content of about 6 grams per liter (g/L) to about 40 grams per liter. In other embodiments, the protein beverage composition has a total protein content of about 8 grams per liter to about 24 grams per liter. In embodiments, the protein beverage composition has a total protein content of about 18 to about 22 grams per liter. In some embodiments, the protein beverage composition has a total protein content of about 16 grams per liter to about 18 grams per liter. Yet in other embodiments, the protein beverage composition has a total protein content about or in any range between about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 grams per liter.

Protein Beverage Properties

Despite the high concentration of protein (e.g., whey protein isolate or collagen), the protein is undetectable or nearly undetectable in the beverage composition. Compared to other protein beverage compositions that have high viscosity, an undesirable taste, and/or must be consumed immediately to avoid protein sedimentation and fouling, the protein beverage compositions described herein are colorless, tasteless, nearly undetectable in liquid water, and shelf stable at room temperature for long periods of time, even at room temperature.

The combination of the type of concentration of ions in the starting water, the type of concentration of those added to the beverage with the protein, as well as the protein itself, result in a protein beverage with a liquid beverage, with unexpectedly highly concentrated and undetectable protein. The starting water and added ions are carefully selected as described herein to provide a beverage that is free of or substantially free of additives, and essentially pure, including simply liquid water and protein. In absence of the proper starting water, ions, and protein, the composition becomes cloudy, colored, viscous, and/or loses shelf stability. In other words, in absence of the ideal combination, the protein in the beverage becomes detectable and undesirable.

The protein beverage composition is optically clear and colorless or transparent in liquid water (not opaque), which means that the protein beverage composition has a visibly clear or non-cloudy appearance that allows visible light to pass and through which distinct image may be apprehended.

The protein beverage composition is not significantly altered by the protein in the liquid, e.g., soft or reverse osmosis water. In other words, the viscosity of the protein beverage composition with protein and liquid water is substantially the same as the liquid water alone.

In one or more embodiments, the protein beverage has a viscosity that is the same or similar to the starting liquid (e.g., water) of about 1 to about 25 milliPascals (mPa) at 5 degrees Celsius and shear rate of $100 \text{ s}^{-1}$. In other embodiments, the protein beverage has a viscosity of about 1.5 to about 2.5 milliPascals at 5 degrees Celsius and shear rate of $100 \text{ s}^{-1}$. Still, in other embodiments, the protein beverage has a viscosity about or in any range between about 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0, and 25.0 milliPascals at 5 degrees Celsius and shear rate of $100 \text{ s}^{-1}$.

In one or more embodiments, the protein beverage has a viscosity that is the same or similar to the starting liquid (e.g., water) of about 0.5 to about 25.0 milliPascals (mPa) at 20 degrees Celsius and shear rate of $100 \text{ s}^{-1}$. In other embodiments, the protein beverage has a viscosity of about 1 to about 5.0 milliPascals at 20 degrees Celsius and shear rate of $100 \text{ s}^{-1}$. Still, in other embodiments, the protein beverage has a viscosity about or in any range between about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0, and 25.0 milliPascals at 20 degrees Celsius and shear rate of 100 s$^{-1}$.

The protein beverage compositions are optically clear, as measured by low turbidity. In embodiments, the protein beverage composition has a turbidity that is the same to similar to the starting liquid (e.g., water) that is less than or equal to 5.0 formazin nephelometric units (FNU) as measured by ISO 7027-1:2016 test method, which uses an infrared light source. In embodiments, the protein beverage composition has a turbidity that is the same to similar to the starting liquid (e.g., water) that is about 0.0001 to about 0.2 FNU as measured by ISO 7027-1:2016 test method. Still yet, in other embodiments, the protein beverage composition has a turbidity that is the same to similar to the starting liquid (e.g., water) that is about or in any range between about 0.0001, 0.001, 0.01, 0.1, 0.15, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 FNU as measured by ISO 7027-1:2016 test method.

In embodiments, the protein beverage composition has a turbidity that is the same to similar to the starting liquid (e.g., water) that is less than or equal to 25.0 Nephelometric Turbidity Units (NTU) as measured by SS-EN ISO 7027-1:2016 test method using a Hach 2100 ISO turbidometer, which uses a white light source. In embodiments, the protein beverage composition has a turbidity that is the same to similar to the starting liquid (e.g., water) that is about 0.1 to about 10 NTU as measured by SS-EN ISO 7027-1:2016 test method. Still yet, in other embodiments, the protein beverage composition has a turbidity that is the same to similar to the starting liquid (e.g., water) that is about or in any range between about 0.1, 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0, and 25.0 NTU as measured by SS-EN ISO 7027-1:2016 test method.

In embodiments, the protein beverage composition is undetectable in color compared to water alone, typically compared to distilled water as a reference standard. The optical clarity is measured as follows. The color of the protein beverage composition is measured using ISO 7887 2012C mod test method using a Konica Minolta CM-5 Spectrophotometer. In embodiments, the L* value is about 90 to about 100, the a* value is about −10 to about 10, and/or the b* value is about −10 to about 10. In other embodiments, the L* value is about or in any range between about 90, 91, 92, 93, 94, 95, 96, 97, 98, 99, and 100; the a* value is about or in any range between about −10, −9, −8, −7, −6, −5, −4, −3, −2, −1, 0, 1, 2, 3, 4, 5, 6, 7, 8, 9, and 10; and/or the b* value is about or in any range between about 10, −9, −8, −7, −6, −5, −4, −3, −2, −1, 0, 1, 2, 3, 4, 5, 6, 7, 8, 9, and 10.

The protein beverage composition has a long and stable shelf-life, even at ambient room temperature, i.e., about 20 to about 25 degrees Celsius. A "stable shelf-life" means that the protein beverage composition's physical properties are not altered over the stated period of time. For example, the protein beverage composition has one or more of the following properties after a stated period of time: remains optically clear (and has the optical properties described above), the protein remains colorless or transparent in liquid water, and/or protein beverage composition maintains a low viscosity (and has the viscosity properties described above). The protein beverage composition is stable and has a stable shelf life at a temperature of about 20 to about 25 degrees Celsius for at least 4 months. In other embodiments, the protein beverage composition is stable and has a stable shelf life at a temperature of about 20 to about 25 degrees Celsius for about or any range between about 4, 5, 6, 7, 8, 9, 10, 11, and 12 months. In other embodiments, the protein beverage composition is stable and has a stable shelf life at a temperature of about 20 to about 25 degrees Celsius for more than 12 months.

The protein beverage composition has a long and stable shelf-life, also at chilled temperatures, i.e., about 2 to about 8 degrees Celsius. The protein beverage composition is stable (and has a stable shelf life) at a temperature of about 2 to about 8 degrees Celsius for at least 4 months. In other embodiments, the protein beverage composition is stable (and has a stable shelf life) at a temperature of about 2 to about 8 degrees Celsius for about or any range between about 4, 5, 6, 7, 8, 9, 10, 11, and 12 months. In some embodiments, the protein beverage composition is stable and has a stable shelf life at a temperature of about 2 to about 8 degrees Celsius for more than 12 months.

The protein beverage composition has a neutral taste profile and is undetectable in liquid water.

Method of Making

FIG. 1 illustrates a flow diagram of a method 100 of making a beverage composition. As shown in box 102, the method includes pre-mixing water, ionic compounds, and protein to form a protein composition. The components are mixed in any order.

As shown in box 104, the method includes pre-heating the protein composition to a temperature of about 40 to about 120 degrees Celsius. In some embodiments, the protein composition is pre-heated at a temperature of about 70 to about 90 degrees Celsius. In embodiments, pre-heating is performed at a temperature about or in any range between about 40, 45, 50, 55, 60, 65, 70, 75, 80, 85, 90, 95, 100, 105, 110, 115, and 120 degrees Celsius.

As shown in box 106, the protein composition is steam injected, subsequent to pre-heating. High-pressure steam is injected directly into the composition, which sterilizes the composition for consumption by heating it to high temperatures for a sufficient period of time to kill bacteria. The resulting composition will be shelf stable, at both ambient and chilled temperatures, and suitable for human and animal consumption. High-pressure steam is injected into the composition to quickly raise the temperature of the composition to about 120 to about 170 degrees Celsius for about 1 to about 11 seconds. In one or more embodiments, the temperature of the composition is raised to about 135 to about 151 degrees Celsius for about 4 to about 8 seconds. In embodiments, the temperature is raised to about or in any range between about 120, 125, 130, 135, 140, 145, 150, 155, 160, 165, and 170 degrees Celsius, and for about or any range between about 1, 2, 3, 4, 5, 6, 7, 8, 9, 10, and 11 seconds.

As shown in box 108, the method 100 includes rapidly cooling the protein beverage composition to about 18 to about 25 degrees Celsius. In some embodiments, the protein composition is cooled to about 18 to about 22 degrees Celsius. In embodiments, the protein beverage composition is cooled to a temperature about or in any range between about 18, 19, 20, 21, 22, 23, 24, and 25 degrees Celsius. The protein composition is placed in a holding tube and then a vacuum chamber where temperature is rapidly reduced. This flash cooling process reduces the risk of thermal damage to the protein, inactivates thermophilic microbes, and removes excess water from the steam.

The method 100 further includes homogenizing the protein composition, after cooling. Homogenization mechanically makes the protein in the liquid uniform.

Optionally, the method 100 further includes infusing oxygen into the homogenized protein composition by injecting oxygen gas ($O_2$). Injecting oxygen gas eliminated the sulfur taste in the protein beverage, which is believed to result from reduced cysteine side chains. Injecting oxygen oxidizes the cysteine side chains and forms cysteine bridges, which eliminates the sulfur taste. Oxygen can be directly injected at any time point following homogenization of the final protein beverage.

Alternatively, instead of infusing oxygen gas, the final beverage can be maintained in an oxygen containing atmosphere (e.g., air) for a period of time (for example, 1 to 21 days), which will effectively oxidize the cysteine groups in the protein and form disulfide bridges. The final beverage can be maintained in a storage container with air (containing oxygen) in the headspace. Over time, e.g., two or three weeks, the protein beverage becomes oxidized and the sulfur taste is eliminated.

The protein beverage is made by adding protein and to liquid water with the above-described ion profile. The protein and liquid water are blended using a mixer. The protein water mixture is purified by one or more processes. In embodiments, purification includes one or more of filtration, direct steam injection ultra-high-temperature (UHT) pasteurization, ultraviolet sterilization, high pressure pasteurization (HPP), aseptic bottling, high temperature short time (HTST) processing, or a combination thereof.

EXAMPLES

Example 1: Whey Protein Mixtures and Waters

Protein beverages were prepared as follows. Whey protein was added to various types of starting water, as well as combined with additional ionic compounds. The soft water profile, reverse osmosis water profile, and tap water profile are shown in Tables 5-7, respectively. Different types and amounts of minerals were added to evaluate the optimal formulation for a clear final beverage with a clear (sulfur-free) taste.

TABLE 5

| Soft water profile | | | | |
| --- | --- | --- | --- | --- |
| Test method | Analysis/ Investigation of | Result | Uncertainty | Units |
| SS-EN ISO 7027-1: 2016 | Turbidity | <0.1 | ±0.12 | FNU |
| In-house method | Odour | — | | |
| In-house method | Odour, type | — | | |
| SS-EN ISO 7887 2012C mod | Color | <5 | ±2 | mg/l Pt |
| SS-EN 27888-1 | Conductivity 25° C. | 21.3 | ±2.13 | mS/m |
| SS-EN ISO 10523: 2012 | pH at 20° C. | 8.3 | ±0.2 | |
| SS-EN ISO 9963-2, ed 1 | Alkalinity | 42 | ±6.3 | mg/l |
| fd SS028118-1 | Chemical oxygen demand | 1.6 | ±0.40 | mg/l |
| ISO 15923-1: 2013 B | Ammonium nitrogen, $NH_4$—N | <0.01 | ±0.005 | mg/l |
| Calculated | Ammonium, $NH_4$ | <0.02 | ±0.01 | mg/l |
| SS-EN ISO 10304-1: 2009 | Nitrate nitrogen, $NO_3$—N | 0.21 | ±0.045 | mg/l |
| Calculated | Nitrate, $NO_3$ | 0.93 | | mg/l |
| ISO 15923-1: 2013 D | Nitrite nitrogen, NO | <0.001 | ±0.0009 | mg/l |
| SS-EN ISO 13395, calc | Nitrite, $NO_2$ | <0.004 | ±0.003 | mg/l |
| Calculated | Sum $NO_3$/50 + $NO_2$/0.5 | <0.02 | | |
| SS-EN ISO 10304-1: 2009 | Fluoride, F | 0.10 | ±0.10 | mg/l |
| SS-EN ISO 10304-1: 2009 | Chloride, Cl | 32 | ±4.8 | mg/l |
| SS-EN ISO 10304-1: 2009 | Sulphate, $SO_4$ | 5.8 | ±0.90 | mg/l |
| SS-EN ISO 11885: 2009 | Aluminium, Al | <0.03 | ±0.02 | mg/l |
| SS-EN ISO 11885: 2009 | Iron, Fe | <0.05 | ±0.01 | mg/l |
| SS-EN ISO 11885: 2009 | Calcium, Ca | 0.27 | ±0.04 | mg/l |
| SS-EN ISO 11885: 2009 | Potassium, K | 2 | ±0.3 | mg/l |
| SS-EN ISO 11885: 2009 | Copper, Cu | <0.02 | ±0.01 | mg/l |
| SS-EN ISO 11885: 2009 | Magnesium, Mg | 0.13 | ±0.040 | mg/l |
| SS-EN ISO 11885: 2009 | Manganese, Mn | <0.02 | ±0.004 | mg/l |
| SS-EN ISO 11885: 2009 | Sodium, Na | 39 | ±5.9 | mg/l |
| Calculated | Hardness (German degrees) | <0.2 | ±0.16 | °dH |

TABLE 6

| | Reverse osmosis water | | | |
|---|---|---|---|---|
| Test method | Analysis/ Investigation of | Result | Uncertainty | Units |
| SS-EN ISO 7027-1: 2016 | Turbidity | <0.21 | ±0.12 | FNU |
| In-house method | Odour | — | | |
| In-house method | Odour, type | — | | |
| SS-EN ISO 7887 2012C mod | Color | <5 | ±2 | mg/l Pt |
| SS-EN 27888-1 | Conductivity 25° C. | <2 | ±0.600 | mS/m |
| SS-EN ISO 10523: 2012 | pH at 20° C. | 7.0 | ±0.2 | |
| SS-EN ISO 9963-2, ed 1 | Alkalinity | 2.8 | ±0.70 | mg/l |
| fd SS028118-1 | Chemical oxygen demand | <0.5 | ±0.25 | mg/l |
| ISO 15923-1: 2013 B | Ammonium nitrogen, $NH_4$—N | <0.01 | ±0.005 | mg/l |
| Calculated | Ammonium, $NH_4$ | <0.02 | ±0.01 | mg/l |
| SS-EN ISO 10304-1: 2009 | Nitrate nitrogen, $NO_3$—N | <0.05 | ±0.0045 | mg/l |
| Calculated | Nitrate, $NO_3$ | <0.3 | | mg/l |
| ISO 15923-1: 2013 D | Nitrite nitrogen, NO | <0.001 | ±0.0009 | mg/l |
| SS-EN ISO 13395, calc | Nitrite, $NO_2$ | <0.004 | ±0.003 | mg/l |
| SS-EN ISO 10304-1: 2009 | Fluoride, F | ±0.05 | ±0.10 | mg/l |
| SS-EN ISO 10304-1: 2009 | Chloride, Cl | 1.1 | ±0.90 | mg/l |
| SS-EN ISO 10304-1: 2009 | Sulphate, $SO_4$ | <1 | ±0.90 | mg/l |
| SS-EN ISO 11885: 2009 | Aluminium, Al | <0.03 | ±0.02 | mg/l |
| SS-EN ISO 11885: 2009 | Iron, Fe | <0.05 | ±0.01 | mg/l |
| SS-EN ISO 11885: 2009 | Calcium, Ca | <0.05 | ±0.01 | mg/l |
| SS-EN ISO 11885: 2009 | Potassium, K | <0.5 | ±0.1 | mg/l |
| SS-EN ISO 11885: 2009 | Copper, Cu | <0.02 | ±0.01 | mg/l |
| SS-EN ISO 11885: 2009 | Magnesium, Mg | <0.1 | ±0.040 | mg/l |
| SS-EN ISO 11885: 2009 | Manganese, Mn | <0.02 | ±0.004 | mg/l |
| SS-EN ISO 11885: 2009 | Sodium, Na | 1.7 | ±0.26 | mg/l |
| Calculated | Hardness (German degrees) | <0.2 | ±0.16 | °dH |

TABLE 7

| | Tap water profile | | | |
|---|---|---|---|---|
| Test method | Analysis/ Investigation of | Result | Uncertainty | Units |
| SS-EN ISO 7027-1: 2016 | Turbidity | <0.1 | ±0.12 | FNU |
| In-house method | Odour | — | | |
| In-house method | Odour, type | — | | |
| SS-EN ISO 7887 2012C mod | Color | <5 | ±2 | mg/l Pt |
| SS-EN 27888-1 | Conductivity 25° C. | 19.0 | ±1.90 | mS/m |
| SS-EN ISO 10523: 2012 | pH at 20° C. | 8.2 | ±0.2 | |
| SS-EN ISO 9963-2, ed 1 | Alkalinity | 44 | ±6.6 | mg/l |
| fd SS028118-1 | Chemical oxygen demand | 1.6 | ±0.40 | mg/l |
| ISO 15923-1: 2013 B | Ammonium nitrogen, $NH_4$—N | <0.01 | ±0.005 | mg/l |
| Calculated | Ammonium, $NH_4$ | <0.02 | ±0.01 | mg/l |
| SS-EN ISO 10304-1: 2009 | Nitrate nitrogen, $NO_3$—N | 0.19 | ±0.045 | mg/l |
| Calculated | Nitrate, $NO_3$ | 0.84 | | mg/l |
| ISO 15923-1: 2013 D | Nitrite nitrogen, $NO_2$—N | <0.001 | ±0.0009 | mg/l |
| SS-EN ISO 13395, calc | Nitrite, $NO_2$ | <0.004 | ±0.003 | mg/l |
| Calculated | Sum $NO_3/50 + NO_2/0.5$ | <0.02 | | |
| SS-EN ISO 10304-1: 2009 | Fluoride, F | 0.10 | ±0.10 | mg/l |
| SS-EN ISO 10304-1: 2009 | Chloride, Cl | 27 | ±4.1 | mg/l |
| SS-EN ISO 10304-1: 2009 | Sulphate, $SO_4$ | 5.8 | ±0.90 | mg/l |
| SS-EN ISO 11885: 2009 | Aluminium, Al | <0.03 | ±0.02 | mg/l |
| SS-EN ISO 11885: 2009 | Iron, Fe | <0.05 | ±0.01 | mg/l |
| SS-EN ISO 11885: 2009 | Calcium, Ca | 21 | ±3.2 | mg/l |
| SS-EN ISO 11885: 2009 | Potassium, K | 1 | ±0.2 | mg/l |
| SS-EN ISO 11885: 2009 | Copper, Cu | <0.02 | ±0.01 | mg/l |

TABLE 7-continued

| Tap water profile | | | | |
|---|---|---|---|---|
| Test method | Analysis/ Investigation of | Result | Uncertainty | Units |
| SS-EN ISO 11885: 2009 | Magnesium, Mg | 1.5 | ±0.23 | mg/l |
| SS-EN ISO 11885: 2009 | Manganese, Mn | <0.02 | ±0.004 | mg/l |
| SS-EN ISO 11885: 2009 | Sodium, Na | 10 | ±1.5 | mg/l |
| Calculated | Hardness (German degrees) | 3.3 | ±0.49 | °dH |

Water, whey protein isolate, and all powder ingredients were combined and mixed using a high shear mixer for 10 minutes. The mixtures were allowed to hydrate for 20 minutes with slow agitation at 20 degrees Celsius. The final mixtures were pre-heated at 80 degrees Celsius for at least 15 minutes, heated to 143 degrees Celsius for 6 seconds, and finally cooled to 20 degrees Celsius. The mixtures were injected with oxygen immediately after cooling to oxidize the sulfur bridges and mitigate the sulfur taste.

Table 8 shows formulations A-G with reverse osmosis and soft water.

TABLE 8

| | Protein/ | | | | | |
|---|---|---|---|---|---|---|
| Batch | Water | Minerals | pH | Appearance | Processibility | Taste |
| A | 4.8 kg Whey protein 300 L RO water | Potassium Bi Carbonate 90 g Magnesium Sulfate 60 g Calcium Chloride 30 g | pH before protein: 8.19 pH after protein: 7.11 DM: 1.7 | Cloudy | Good but more viscous than water | OK |
| B | 4.8 kg Whey protein 300 L RO water | Potassium Bi Carbonate 90 g | pH before protein: 8.55 pH after protein: 7.43 | Clear | Good | OK but hints of bitterness and sulfur could be detected if aerated |
| C | 4.8 kg Whey protein 300 L RO water | Sodium Bi Carbonate 90 g | pH before protein: 8.26 pH after protein: 7.25 | Clear | Good | OK but maybe a little bitter |
| D | 4.8 kg Whey Protein 300 L RO water | Magnesium Sulfate 90 g | pH before protein: 7.62 pH after protein: 6.81 | Very cloudy | Heavy fouling after less than 20 minutes. Steam temp went from 157 degrees Celsius up to 168 degrees Celsius | N/A |
| E | 4.8 kg Whey protein 300 L Soft water | Potassium Bi Carbonate 30 g Magnesium Sulfate 21 g Tri Sodium Citrate 100 g | pH before protein: 8.38 pH after protein: 7.06 | Clear | Good | OK but something feels on the tip of the tongue |
| F | 4.8 kg Whey protein 300 L Soft water | Potassium Bi Carbonate 30 g Tri Sodium Citrate 100 g | pH before protein: 8.15 pH after protein: 7.11 | Clear | Good | OK but a tiny bit of sulfur could be detected if aerated |

TABLE 8-continued

| | | | Protein beverage formulations A-G | | | | |

| Batch | Protein/ Water | Minerals | pH | Appearance | Processibility | Taste |
|---|---|---|---|---|---|---|
| G | 4.8 kg Whey protein 300 L Soft water | Potassium Bi Carbonate 30 g | pH before protein: 8.38 pH after protein: 7.17 pH after adjustment with 500 mL 10% NaOH: 9.4 | Clear | Good | OK but a tiny bit of sulfur could be detected if aerated |

Table 9 shows formulations H-L with soft water.

TABLE 9

| | | Protein beverage formulations H-L | |
|---|---|---|---|
| Batch | Protein/ Water | Minerals | Processibility |
| H | 4.8 kg Whey protein 300 L Soft water | 300 g 10% NaOH | Good |
| I | 4.8 kg Whey protein 300 L Soft water | 300 g 10% NaOH 100 g Tri Sodium Citrate | Good |
| J | 4.8 kg Whey protein 300 L Soft water | 300 g 10% NaOH 100 g Sodium Hexa Phosphate | Good |
| K | 6.0 kg Whey protein 300 L Soft water | 300 g 10% NaOH 100 g Sodium Hexa Phosphate | Good |
| L | 7.2 kg Whey protein 300 L Soft water | 300 g 10% NaOH 100 g Sodium Hexa Phosphate | Good |

Taste of the batches was evaluated after 3.5 weeks. Most of the samples tasted nice and clean with minimal sulfur. Clarity was good in the samples, except for a slight cloudiness with higher protein content. The most favorable batches were those comprised of soft water with a chelating agent and sodium hydroxide (I, J, K, and L) due to their relative clarity and preferred taste.

Example 2: Microbial Analysis of Whey Protein Batches A-G

Microbial analyses of whey protein batches A, B, C, E, F, and G were conducted. The batches were pre-incubated at 30 degrees Celsius for 14 days. Ten (10) microliters of each sample was streaked on PCA plates (4 streaks per plate). After streaking, the plates were incubated for 3 days at 30 degrees Celsius to detect the growth of mesophilic microorganisms. The plates were examined after 3 days of incubation.

All batches processed well except batch D. The magnesium salt most likely destabilized the protein, which was visible after mixing. Immediately after processing, the samples had a clear sulfur note, as expected. Oxygen injection was used to minimize this taste. Three (3) weeks after oxygen injection, the samples had very little to no sulfur taste. The appearances of the samples was also clear after 3 weeks, except for batch A, which was a little cloudy.

Example 3: Properties of Whey Protein Batches A-L

Physical and chemical properties of the whey protein beverage formulations from Tables 8 and 9 were analyzed. Table 10 shows the results of turbidity, dissolved oxygen, and viscosity at 4 and 20 degrees Celsius.

The turbidity was measured using a Hach Iso Turbidity Meter according to ISO 7027-1:2016 test method. Viscosity was measured according to ISO 7027-1:2016 test method. Dissolved oxygen content was measured according to SS028118-1 test method.

TABLE 10

| | | | | | Physical and chemical properties | | | | |
|---|---|---|---|---|---|---|---|---|---|
| | | Dry | | Turbidity | Turbidity (NTU) | Dissolved Oxygen measurement | | Viscosity (4° C., | Viscosity (20° C., |
| Sample ID | matter (%) | pH (25° C.) | (NTU) Time = 0 | After 30 days | O$_2$ [mg/l] | T (° C.) | 100 s$^{-1}$, mPas) | 100 s$^{-1}$, mPas) |
| Soft | — | — | — | — | — | — | 1.6 | |
| A | 1.8 | 7.92 | — | — | 5.92 | — | — | — |
| B | 1.69 | 7.91 | — | — | 6.29 | — | — | — |
| C | 1.78 | 7.98 | — | — | 6.32 | — | — | — |
| E | 1.83 | 7.35 | — | — | 4.3 | — | — | — |
| F | 1.56 | 7.35 | — | — | OFL | — | — | — |
| G | 1.37 | 9.36 | — | — | OFL | — | 2 | 1 |
| H | 1.24 | 8.19 | 1.06 | 1.40 | 5.44 | 23.2 | — | — |
| I | 2.03 | 8.15 | 1.15 | 1.64 | 5.89 | 23.3 | 2 | — |
| J | 1.67 | 8.04 | 1.0 | 1.79 | 5.92 | 23.5 | — | — |

TABLE 10-continued

| | | | | Turbidity | Dissolved Oxygen measurement | | Viscosity (4° C., | Viscosity (20° C., |
|---|---|---|---|---|---|---|---|---|
| | Dry | | Turbidity | (NTU) | | | | |
| Sample ID | matter (%) | pH (25° C.) | (NTU) Time = 0 | After 30 days | $O_2$ [mg/l] | T (° C.) | 100 s$^{-1}$, mPas) | 100 s$^{-1}$, mPas) |
| K | 2.02 | 7.79 | 1.39 | 1.54 | 5.64 | 23.3 | 2 | — |
| L | 2.44 | 7.78 | 1.47 | 1.99 | 5.96 | 23.4 | 2.1 | — |

*Tap water turbidity = 0.16 NTU

Table 11 compares the viscosity of samples I, K, and L at 5 degrees Celsius compared to tap water (profile shown in Table 7).

TABLE 11

| | | | | Viscosity | | | |
|---|---|---|---|---|---|---|---|
| Sample | | | K | | Viscosity (mPas) | | |
| ID | Temp ° C. | n | (Pas$^n$) | 10 s$^{-1}$ | 50 s$^{-1}$ | 100 s$^{-1}$ | 500 s$^{-1}$ |
| Tap water | 5 | 1 | 0.00159 | 1.6 | 1.6 | 1.6 | 1.6 |
| I | 5 | 0.998 | 0.002 | 2 | 2 | 2 | 2 |
| K | 5 | 0.998 | 0.00202 | 2 | 2 | 2 | 2 |
| L | 5 | 1 | 0.00207 | 2.1 | 2.1 | 2.1 | 2.1 |

Table 12 shows the results of color analysis of batches H, I, J, K, and L using a Minolta Spectrophotometer CM-5 according to ISO 7887 2012C mod test method. Color was analyzed 6 days after production. Soft water (Table 7) was used as a reference.

TABLE 12

| | | | | Color | | | |
|---|---|---|---|---|---|---|---|
| Sample ID | Illuminant | L* | a* | b* | L* | a* | b* |
| Soft water | D65/10° | 100 | 0 | 0 | | | |
| H | D65/10° | 99.6 | −0.3 | 1.3 | −0.4 | −0.3 | 1.3 |
| I | D65/10° | 99.6 | −0.3 | 1.3 | −0.4 | −0.3 | 1.3 |
| J | D65/10° | 99.6 | −0.3 | 1.4 | −0.4 | −0.3 | 1.4 |
| K | D65/10° | 99.6 | −0.4 | 1.6 | −0.4 | −0.4 | 1.6 |
| L | D65/10° | 99.5 | −0.4 | 1.9 | −0.5 | −0.4 | 1.9 |

Example 4: Whey Protein Batches O-X

Whey protein was added to reverse osmosis (RO) water ad described above. Different types of amounts of minerals were added to evaluate the optimal formulation for a clear final beverage with a clear (sulfur-free) taste.

Water, whey protein isolate, and all powder ingredients were combined and mixed using a high shear mixer for 10 minutes. The mixture was allowed to hydrate for 20 minutes with slow agitation at 20 degrees Celsius. The final mixture was pre-heated at 65 degrees (batch S), 80 degrees (batch O, P, Q, R, U, V, W, and X), or 95 degrees (batch T) Celsius for at least 15 minutes, heated to 143 degrees (batches O-Q and S-X) or 147 degrees (batch R) Celsius for 6 seconds, and finally cooled to 20 degrees Celsius. Table 13 shows formulations O-X, demonstrating pH measured immediately after processing, turbidity, viscosity, and subsequent observations.

The variable pre-heating temperature of 65, 80, or 90 degrees resulted in no detectable difference, which was favorable because it demonstrated that higher temperatures may be utilized without a detrimental effect. The slight increase in sterilization temperature for batch R also did not result in a detectable difference.

Batch W, with only 150 mg/L sodium citrate in RO water was the most favorable batch in terms of color, clarity, turbidity, and viscosity. Batch V, with 150 mg/L sodium citrate and 50 mg/L sodium chloride was the next best in terms of color, clarity, turbidity, and viscosity.

The observed smell, taste, and appearance was measured after incubation at 30 degrees Celsius for 14 days. The eggy smell immediately after opening is typical of disulfide bond formation, which would dissipate over time with oxygenation, as demonstrated in Example 1.

TABLE 13

| | | | | | Viscosity (20 degrees | |
|---|---|---|---|---|---|---|
| | Protein/ | | pH (25 degrees | Turbidity | Celsius, | |
| Batch | Water | Minerals | Celsius) | (NTU) | 100 s$^{-1}$, mPas) | Observations |
| O | 20 g/L Whey protein in RO water | None | 6.81 | 88.1 | 1.5 | Eggy directly after opening; clear appearance |

TABLE 13-continued

| | | | | | Viscosity (20 degrees | |
| | Protein/ | | pH (25 degrees | Turbidity | Celsius, | |
| Batch | Water | Minerals | Celsius) | (NTU) | 100 s$^{-1}$, mPas) | Observations |
|---|---|---|---|---|---|---|
| P | 20 g/L Whey protein in RO water | 75 mg/L Sodium chloride 45 mg/L Calcium chloride 35 mg/L Sodium bicarbonate 333.33 mg/L Sodium citrate 100 mg/L Sodium hydroxide | 7.78 | 10.9 | 1.5 | Eggy directly after opening; bitter taste; clear appearance |
| Q | 20 g/L Whey protein in RO water | 50 mg/L Calcium chloride 100 mg/L Sodium bicarbonate 60 mg/L Potassium bicarbonate 150 mg/L Sodium citrate | 7.40 | 6.62 | 2.2 | Eggy directly after opening; off note protein taste; cloudy appearance |
| R | 20 g/L Whey protein in RO water | 50 mg/L Calcium chloride 100 mg/L Sodium bicarbonate 60 mg/L Potassium bicarbonate 150 mg/L Sodium citrate | 7.43 | 6.67 | 1.5 | Eggy directly after opening; neutral taste; clear appearance |
| S | 20 g/L Whey protein in RO water | 50 mg/L Calcium chloride 100 mg/L Sodium bicarbonate 60 mg/L Potassium bicarbonate 150 mg/L Sodium citrate | 7.40 | 5.61 | 2.3 | Eggy directly after opening; neutral taste; clear appearance |
| T | 20 g/L Whey protein in RO water | 50 mg/L Calcium chloride 100 mg/L Sodium bicarbonate 60 mg/L Potassium bicarbonate 150 mg/L Sodium citrate | 7.36 | 30.9 | 1.5 | Eggy directly after opening; neutral taste; cloudy appearance |
| U | 20 g/L Whey protein in RO water | 333.33 mg/L Sodium citrate 100 mg/L Sodium hydroxide | 7.83 | 1.71 | 1.7 | Eggy directly after opening; neutral taste; clear appearance |

TABLE 13-continued

| | | | | | Viscosity (20 degrees | |
| Batch | Protein/ Water | Minerals | pH (25 degrees Celsius) | Turbidity (NTU) | Celsius, 100 s$^{-1}$, mPas) | Observations |
|---|---|---|---|---|---|---|
| V | 20 g/L Whey protein in RO water | 50 mg/L Calcium chloride 150 mg/L Sodium citrate | 6.86 | 108 | 1.3 | Eggy directly after opening; slight off note protein taste; cloudy appearance |
| W | 20 g/L Whey protein in RO water | 150 mg/L Sodium citrate | 6.87 | 7.96 | 1.7 | Eggy directly after opening; neutral taste; clear appearance |
| X | 20 g/L Whey protein in RO water | 50 mg/L Calcium chloride 100 mg/L Sodium bicarbonate 60 mg/L Potassium bicarbonate 150 mg/L Sodium citrate | 7.36 | 3.08 | 1.6 | Eggy directly after opening; neutral taste; clear appearance |

Table 14 shows the salts added from Table 13, and the resulting ion concentrations in solution (mg/L).

TABLE 14

Salt compounds added and resulting ions in solution

| Salt | Salt mg/L | Ions | Ion mg/L |
|---|---|---|---|
| Sodium Chloride, NaCl, 58.44 g/mol | 75 | Sodium, 22.99 g/mol | 29 |
| | | Chloride, 35.43 g/mol | 46 |
| Potassium Bicarbonate, KHCO$_3$, 100.12 g/mol | 60 | Potassium, 39.10 g/mol | 23 |
| | | Bicarbonate, 61.02 g/mol | 37 |
| Calcium Chloride, CaCl$_2$, 100.98 g/mol | 45, 50 | Calcium, 40.08 g/mol | 18, 20 |
| | | Chloride, 35.43 g/mol | 32, 35 |

TABLE 14-continued

Salt compounds added and resulting ions in solution

| Salt | Salt mg/L | Ions | Ion mg/L |
|---|---|---|---|
| Sodium Bicarbonate, NaHCO$_3$, 84.01 g/mol | 35, 100 | Sodium, 22.99 g/mol | 10, 27 |
| | | Bicarbonate, 61.02 g/mol | 25, 73 |
| Sodium Citrate, Na$_3$C$_6$H$_5$O$_7$, 258.06 g/mol | 150, 333.33 | Sodium, 22.99 g/mol | 40, 89 |
| | | Citrate, 192.13 g/mol | 112, 248 |
| Sodium Hydroxide, NaOH, 40.00 g/mol | 100 | Sodium, 22.99 g/mol | 57 |
| | | Hydroxide, 17.01 g/mol | 43 |

Table 15 shows the added concentrations of ions in solution (mg/L) based on salts (from Table 14) added to batches O-X (from Table 13) and with reverse osmosis (RO) water and soft (S) water (Tables 5 and 6), for comparison, as well as the total resulting ions in solution for each batch. All units are mg/L.

TABLE 15

Added and total ion content, RO versus soft water for batches O-X

| Ions | RO | Soft | O | O, total | P | P, total | Q/R/S/ T/X | Q/R/S/ T/X, total | U | U, total | V | V, total | W | W, total |
|---|---|---|---|---|---|---|---|---|---|---|---|---|---|---|---|
| Sodium | | 10--100 | | 10-100 (S) | 185 | 195--285 (S) | 67 | 77--167 (S) | 146 | 156--246 (S) | 69 | 79--169 (S) | 40 | 50--140 (S) |
| | 0.001--10 | | | 0.001--10 (RO) | 185 | 185--195 (RO) | 67 | 67--77 (RO) | | 146--156 (RO) | | 0.001--10 (RO) | | 40--50 (RO) |
| Potassium | | 1--5 | | 1--5 (S) | | 1--5 (S) | 23 | 24--28 (S) | | 1--5 (S) | | 1--5 (S) | | 1--5 (S) |
| | 0.001--1 | | | 0.001-1 (RO) | | 0.001-1 (RO) | 23 | 23--24 (RO) | | 0.001-1 (RO) | | 0.001-1 (RO) | | 0.001-1 (RO) |
| Calcium | | 0.001--1 | | 0.001--1 (S) | 18 | 18--19 (S) | 20 | 20--21 (S) | | 0.001--1 (S) | | 0.001--1 (S) | | 0.001--1 (S) |
| | 0.001--1 | | | 0.001--1 (RO) | 18 | 18--19 (RO) | 20 | 20--21 (RO) | | 0.001--1 (RO) | | 0.001--1 (RO) | | 0.001--1 (RO) |

TABLE 15-continued

Added and total ion content, RO versus soft water for batches O-X

| Ions | RO | Soft | O | O, total | P | P, total | Q/R/S/T/X | Q/R/S/T/X, total | U | U, total | V | V, total | W | W, total |
|---|---|---|---|---|---|---|---|---|---|---|---|---|---|---|
| Magnes. | | 0.001-1 | | 0.001-1 (S) | | 0.001--1 (S) | | 0.001--1 (S) | | 0.001-1 (S) | | 0.001-1 (S) | | 0.001-1 (S) |
| | 0.001--1 | | | 0.001--1 (RO) | | 0.001--1 (RO) | | 0.001--1 (RO) | | 0.001--1 (RO) | | 0.001--1 (RO) | | 0.001--1 (RO) |
| Chloride | | 15-50 | | 0.001--1 (S) | 78 | 93--128 (S) | 35 | 50--85(S) | | 15--50(S) | | 15--50 (S) | | 15--50 (S) |
| | 0.001--10 | | | 0.001--10 (RO) | 78 | 78--88 (RO) | 35 | 35--45 (RO) | | 0.001--10 (RO) | | 0.001--10 (RO) | | 0.001--10 (RO) |
| Sulfate | | 1--50 | | 1--50 (S) | | 1--50 (S) | | 1--50 (S) | | 1--50 (S) | | 1--50 (S) | | 1--50 (S) |
| | 0.001--5 | | | 0.001--5 (RO) | | 0.001--5 (RO) | | 0.001--5 (RO) | | 0.001--5 (RO) | | 0.001--5 (RO) | | 0.001--5 (RO) |
| Hydroxide | | | | 43 | | 43 | | | 57 | 57 | | | | |
| Bicarb. | | | | | | | 110 | 110 | | | | | | |
| Citrate | | | | 248 | | 248 | 112 | 112 | 248 | 248 | 112 | | 112 | 112 |

Table 16 shows the results of color analysis of batches O-X using a Minolta Spectrophotometer CM-5 according to ISO 7887 2012C mod test method. Color was analyzed 6 days after production. Distilled water was used as a reference.

TABLE 16

| | | | | Color | | | |
|---|---|---|---|---|---|---|---|
| Sample ID | Illuminant | L* | a* | b* | ΔL* | Δa* | Δb* |
| Distilled water | D65/10° | 97 | 0 | 0.1 | | | |
| O | D65/10° | 90 | 0.31 | 7.51 | −6.63 | 0.5 | 7.43 |
| P | D65/10° | 95.7 | −0.4 | 2.14 | −0.96 | −0.3 | 2.06 |
| Q | D65/10° | 96.1 | −0.5 | 2.03 | −0.63 | −0.3 | 1.94 |
| R | | 96.2 | −0.5 | 1.82 | −0.5 | −0.3 | 1.73 |
| S | | 96.1 | −0.5 | 1.82 | −0.56 | −0.3 | 1.73 |
| T | | 92.7 | −0.2 | 7.31 | −3.97 | 0 | 7.23 |
| U | | 96.3 | −0.5 | 1.6 | −0.4 | −0.3 | 1.52 |
| V | | 90.9 | 0.98 | 9.39 | −5.78 | 1.1 | 9.3 |

TABLE 16-continued

| | | | | Color | | | |
|---|---|---|---|---|---|---|---|
| Sample ID | Illuminant | L* | a* | b* | ΔL* | Δa* | Δb* |
| W | | 99 | −0.2 | 2.01 | 2.36 | −0.1 | 1.93 |
| X | | 99.4 | −0.2 | 1.3 | 2.74 | −0.1 | 1.22 |

Example 5: Collagen Batches N, Y, and Z

Collagen was added to reverse osmosis (RO) water as described above. Different types of amounts of minerals were added to evaluate the optimal formulation for a clear final beverage with a clear (sulfur-free) taste.

Water, collagen, and all powder ingredients were combined and mixed using a high shear mixer for 10 minutes. The mixture was allowed to hydrate for 20 minutes with slow agitation at 20 degrees Celsius. The final mixture was pre-heated at 80 degrees Celsius for at least 15 minutes, heated to 143 degrees Celsius for 6 seconds, and finally cooled to 20 degrees Celsius.

Table 17 shows formulations N, Y, and Z demonstrating pH measured immediately after processing, turbidity, viscosity, and subsequent observations.

TABLE 17

Collagen protein beverage formulations N, Y, and Z

| Batch | Protein/ Water | Minerals | pH (25 degrees Celsius) | Turbidity (NTU) | Viscosity (20 degrees Celsius, 100 s$^{-1}$, mPas) | Observations |
|---|---|---|---|---|---|---|
| N | 20 g/L Collagen protein in RO water | None | 6.72 | 2.97 | 1.1 | Neutral smell, "Maillard taste," yellow clear appearance |
| Y | 20 g/L Collagen protein in RO water | 50 mg/L Calcium chloride 100 mg/L Sodium bicarbonate 60 mg/L Potassium bicarbonate 150 mg/L Sodium citrate | 7.32 | 4.62 | 1.1 | Neutral smell, "Maillard taste," yellow clear appearance |

TABLE 17-continued

| | | | pH (25 degrees Celsius) | Turbidity (NTU) | Viscosity (20 degrees Celsius, 100 s$^{-1}$, mPas) | |
|---|---|---|---|---|---|---|
| Batch | Protein/ Water | Minerals | | | | Observations |
| Z | 20 g/L Collagen protein in RO water | 150 mg/L Sodium citrate | 6.74 | 2.60 | 1.1 | Neutral smell, "Maillard taste," yellow clear appearance |

Table 18 shows the results of color analysis of batches O-X using a Minolta Spectrophotometer CM-5 according to ISO 7887 2012C mod test method. Color was analyzed 6 days after production. Distilled water was used as a reference.

TABLE 18

| | | | | | | | |
|---|---|---|---|---|---|---|---|
| | Color of collagen batches N and Y | | | | | | |
| Sample ID | Illuminant | L* | a* | b* | ΔL* | Δa* | Δb* |
| Distilled water | D65/10° | 97 | 0 | 0.1 | | | |
| N | D65/10° | 95.7 | −0.8 | 4.56 | −1.02 | −0.6 | 4.47 |
| Y | D65/10° | 98.9 | −0.7 | 4.57 | 2.26 | −0.5 | 4.49 |
| Z | D65/10° | 99 | −0.6 | 4.52 | 2.34 | −0.5 | 4.43 |

Collagen batches N, Y, and Z demonstrated that optically clear, shelf-stable collagen waters can be produced in absence of additional additives such as sweeteners. Batch Z appeared to be the best in terms of clarity.

Example 6: Commercial Sterility

Batches N, O, P, Q, R, S, T, U, V, W, X, Y, and Z were pre-incubated at 30 degrees Celsius for 14 days, with each performed in triplicate. Ten (10) microliters of every sample were streaked on PCA plates (3 streaks/plate). The plates were incubated for three days at 30 degrees Celsius to detect the growth of mesophilic microorganisms. As shown in Table 19, there was no indication of growth on the plates, demonstrating shelf stability. Batches N, Y, and Z were collagen.

TABLE 19

| | |
|---|---|
| Microorganism growth | |
| Batch name | Growth/ No growth |
| N | No growth |
| | No growth |
| | No growth |
| O | No growth |
| | No growth |
| | No growth |
| P | No growth |
| | No growth |
| | No growth |
| Q | No growth |
| | No growth |
| | No growth |
| R | No growth |
| | No growth |
| | No growth |

TABLE 19-continued

| | |
|---|---|
| Microorganism growth | |
| Batch name | Growth/ No growth |
| S | No growth |
| | No growth |
| | No growth |
| T | No growth |
| | No growth |
| | No growth |
| U | No growth |
| | No growth |
| | No growth |
| V | No growth |
| | No growth |
| | No growth |
| W | No growth |
| | No growth |
| | No growth |
| X | No growth |
| | No growth |
| | No growth |
| Y | No growth |
| | No growth |
| | No growth |
| Z | No growth |
| | No growth |
| | No growth |

Various embodiments of the present invention are described herein with reference to the related drawings. Alternative embodiments can be devised without departing from the scope of this invention.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A beverage composition for human, animal, or other organism consumption comprising:
water;
about 5 to about 400 milligrams per liter of a chelating agent;
collagen protein in an amount of about 6 to about 40 grams per liter;
wherein the beverage composition has a pH of about 4.6 to about 11.0;
wherein the beverage composition is substantially free of a food acid;
wherein the beverage composition is optically clear as measured by a turbidity of about 0.0001 to about 25 NTU as measured by ISO 7027-1:2016 test method; and
wherein the beverage composition has a stable shelf life at a temperature of about 20 to about 25 degrees Celsius wherein the chelating agent is trisodium citrate.

2. The beverage composition of claim 1, wherein the beverage composition has a viscosity of about 1 to about 25 milliPascals at 5 degrees Celsius and shear rate of 100 s$^{-1}$.

3. The beverage composition of claim 1, wherein the collagen protein is a bovine collagen, fish collagen, plant-based collagen, or a combination thereof.

4. The beverage composition of claim 3, wherein the plant-based collagen is seaweed collagen.

5. The beverage composition of claim 1, wherein the beverage composition is substantially free of a sweetener.

6. The beverage composition of claim 1, wherein the beverage composition is substantially free of a flavoring agent.

7. The beverage composition of claim 1, wherein the beverage composition is substantially free of a de-foaming agent.

8. The beverage composition of claim 1, wherein the beverage composition is colorless.

9. The beverage composition of claim 1, further comprising a coloring agent.

10. The beverage composition of claim 1, wherein the collagen protein is a plant-based collagen protein.

11. A method of making a beverage composition, the method comprising:
providing water with an ion profile;
adding at least one ionic compound to the water; and
adding collagen protein to the water in an amount of about 6 to about 40 grams per liter;
pre-heating the beverage composition to a temperature of about 40 to about 120 degrees Celsius;
steam injecting the beverage composition to raise a temperature of the beverage composition to about 120 to about 170 degrees Celsius for about 1 to about 11 seconds; and
cooling the beverage composition to about 18 to about 25 degrees Celsius;
wherein the beverage composition is substantially free of a food acid;
wherein the beverage composition has a pH of about 4.6 to about 10.0; and
wherein the beverage composition is optically clear as measured by a turbidity of about 0.0001 to about 25 NTU as measured by ISO 7027-1:2016 test method; and
wherein the beverage composition has a stable shelf life at a temperature of about 20 to about 25 degrees Celsius wherein the at least one ionic compound is a chelating agent, and wherein the chelating agent is trisodium citrate added in an amount of about 0.1 to about 0.5 milligrams per milliliter.

12. The method of claim 11, wherein the collagen protein is wherein the collagen protein is a bovine collagen, fish collagen, plant-based collagen, or a combination thereof.

13. The method of claim 12, wherein the plant-based collagen is seaweed collagen.

14. The method of claim 11, wherein the beverage composition is substantially free of a sweetener, a flavoring agent, a de-foaming agent, or a combination thereof.

15. The method of claim 11, further comprising adding a coloring agent to the beverage composition.

16. The method of claim 11, wherein the collagen protein is a plant-based collagen protein.

17. A beverage composition for human, animal, or other organism consumption comprising:

water; and collagen protein in an amount of about 6 to about 40 grams per liter;

wherein the beverage composition has a pH of about 4.6 to about 10.0;

wherein the beverage composition is substantially free of a food acid;

wherein the beverage composition is optically clear as measured by a turbidity of about 0.0001 to about 25 NTU as measured by ISO 7027-1:2016 test method;

wherein the beverage composition has a stable shelf life at a temperature of about 20 to about 25 degrees Celsius for at least 4 months; and wherein the beverage composition is made by:

pre-heating the beverage composition to a temperature of about 40 to about 120 degrees Celsius;

steam injecting the beverage composition to raise a temperature of the beverage composition to about 120 to about 170 degrees Celsius for about 1 to about 11 seconds; and cooling the beverage composition to about 18 to; wherein the beverage composition further comprises about 5 to about 400 milligrams per liter of a chelating agent, and wherein the chelating agent is trisodium citrate.

18. The beverage composition of claim 17, wherein the collagen protein is a bovine collagen, fish collagen, plant-based collagen, or a combination thereof.

19. The beverage composition of claim 18, wherein the plant-based collagen is seaweed collagen.

* * * * *